US011319435B2

(12) United States Patent
Misumi et al.

(10) Patent No.: US 11,319,435 B2
(45) Date of Patent: May 3, 2022

(54) HEAT-CURABLE RESIN COMPOSITION, PREPREG, AND FIBER-REINFORCED COMPOSITE MATERIAL

(71) Applicant: Toray Industries, Inc., Tokyo (JP)

(72) Inventors: Jun Misumi, Ehime (JP); Ginpei Machida, Ehime (JP); Hiroaki Sakata, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 16/969,650

(22) PCT Filed: Feb. 6, 2019

(86) PCT No.: PCT/JP2019/004260
§ 371 (c)(1),
(2) Date: Aug. 13, 2020

(87) PCT Pub. No.: WO2019/167579
PCT Pub. Date: Sep. 6, 2019

(65) Prior Publication Data
US 2020/0399462 A1    Dec. 24, 2020

(30) Foreign Application Priority Data

Feb. 27, 2018 (JP) ............................. JP2018-032782

(51) Int. Cl.
| | |
|---|---|
| *C08J 5/24* | (2006.01) |
| *C08G 59/32* | (2006.01) |
| *C08G 59/38* | (2006.01) |
| *C08G 59/50* | (2006.01) |
| *C08G 59/56* | (2006.01) |
| *C08L 63/00* | (2006.01) |
| *B32B 27/26* | (2006.01) |
| *B32B 27/38* | (2006.01) |
| *C08L 63/10* | (2006.01) |
| *C08K 5/18* | (2006.01) |
| *C08L 63/04* | (2006.01) |
| *C08L 79/00* | (2006.01) |
| *C08L 81/06* | (2006.01) |

(52) U.S. Cl.
CPC .............. *C08L 63/10* (2013.01); *C08G 59/50* (2013.01); *C08J 5/24* (2013.01); *C08K 5/18* (2013.01); *C08L 63/04* (2013.01); *C08L 79/00* (2013.01); *C08L 81/06* (2013.01)

(58) Field of Classification Search
None
See application file for complete search history.

(56) References Cited

U.S. PATENT DOCUMENTS

| | | | | |
|---|---|---|---|---|
| 4,142,034 A | * | 2/1979 | Schroll | .................. C08G 59/56 |
| | | | | 528/120 |
| 2011/0210454 A1 | | 9/2011 | Xiao et al. | |
| 2012/0309923 A1 | | 12/2012 | Ogawa et al. | |
| 2016/0304684 A1 | | 10/2016 | Ellinger et al. | |
| 2018/0201721 A1 | * | 7/2018 | Panchenko | .............. C08K 7/02 |
| 2018/0251612 A1 | | 9/2018 | Fujita et al. | |

FOREIGN PATENT DOCUMENTS

| | | |
|---|---|---|
| JP | 62184015 A | 8/1987 |
| JP | 62185720 A | 8/1987 |
| JP | 06260536 A | 9/1994 |
| JP | 10178040 A | 6/1998 |
| JP | 2005506394 A | 3/2005 |
| JP | 2009221460 A | 10/2009 |
| JP | 2011162710 A | 8/2011 |
| JP | 2012509961 A | 4/2012 |
| JP | 2017504499 A | 2/2017 |
| JP | 2017132896 A | 8/2017 |
| WO | 2017038603 A1 | 3/2017 |

OTHER PUBLICATIONS

International Search Report and Written Opinion for International Application No. PCT/JP2019/004260, dated Apr. 23, 2019, 7 pages.

* cited by examiner

*Primary Examiner* — Michael J Feely
(74) *Attorney, Agent, or Firm* — Ratnerprestia

(57) ABSTRACT

A thermosetting resin composition at least including: [A] an epoxy resin containing two or more glycidyl groups; [B] a cyanate ester resin containing two or more cyanate groups; and [C] an amine compound; and satisfying the following conditions (1) and (2): (1) 0.25≤the number of moles of glycidyl groups in the thermosetting resin composition/the number of moles of cyanate groups in the thermosetting resin composition≤1.5; and (2) 0.05≤the number of moles of active hydrogen contained in the amino groups in the thermosetting resin composition/the number of moles of cyanate groups in the thermosetting resin composition<0.5; and a prepreg and a fiber reinforced composite material using the thermosetting resin composition. Provided are a thermosetting resin composition having excellent mechanical properties and heat resistance in a high-temperature environment after moisture absorption, and having excellent reactivity that allows curing in a short time; a prepreg prepared by impregnating a reinforced fiber with a thermosetting resin composition, which prepreg has excellent handling ability (tackiness properties) at room temperature; and a fiber reinforced composite material including a thermosetting resin composition and a reinforced fiber.

13 Claims, No Drawings

_US 11,319,435 B2_

HEAT-CURABLE RESIN COMPOSITION, PREPREG, AND FIBER-REINFORCED COMPOSITE MATERIAL

CROSS REFERENCE TO RELATED APPLICATIONS

This is the U.S. National Phase application of PCT/JP2019/004260, filed Feb. 6, 2019, which claims priority to Japanese Patent Application No. 2018-032782, filed Feb. 27, 2018, the disclosures of each of these applications being incorporated herein by reference in their entireties for all purposes.

FIELD OF THE INVENTION

The present invention relates to a thermosetting resin composition having excellent mechanical properties and heat resistance in a high-temperature environment after moisture absorption, and having excellent reactivity that allows curing in a short time; a prepreg prepared by impregnating a reinforced fiber with a thermosetting resin composition, which prepreg has excellent handling ability (tackiness properties) at room temperature; and a fiber reinforced composite material including a thermosetting resin composition and a reinforced fiber.

BACKGROUND OF THE INVENTION

Fiber reinforced composite materials comprising: a reinforced fiber such as a carbon fiber or glass fiber; and a thermosetting resin such as an epoxy resin, phenol resin, or cyanate ester resin; are lightweight, and have excellent mechanical properties such as strength and stiffness, and also heat resistance and corrosion resistance. Therefore, they have been practically used in a number of fields such as the fields of aerospace, automobiles, railway vehicles, boats and ships, civil engineering and construction, and sporting goods. In particular, for uses requiring high performance, fiber reinforced composite materials using continuous reinforced fibers are used, and, as the reinforced fibers, carbon fibers having an excellent specific strength and specific elastic modulus are used. Since fiber reinforced composite materials are used in an increasing number of cases in recent years, they are more severely required to have such properties. In particular, in the cases of application to structural materials for use in the aerospace, the materials have high surface temperature due to air friction, and absorb moisture in the clouds. Therefore, the materials are required to have sufficient physical properties even in a high-temperature environment after moisture absorption.

Common epoxy resin composite materials tend to absorb moisture, and to have insufficient mechanical properties and heat resistance in a high-temperature environment after moisture absorption. Common cyanate ester resin composite materials are less likely to absorb moisture, and have excellent mechanical properties even in a high-temperature environment after moisture absorption. However, since they have low reactivity, their molding requires a high temperature of not less than 200° C., and takes a long time, which is problematic. Further, cyanate ester resins generally have high crystallinity, and are solid at about room temperature. Therefore, when they are made into prepregs by impregnation of reinforced fibers therewith, they have low tackiness properties, so that the prepregs have poor handling abilities, which is problematic. Thus, development of a thermosetting resin composition having excellent mechanical properties and heat resistance in a high-temperature environment after moisture absorption, having excellent reactivity that allows curing at low temperature or in a short time, and having, as a prepreg, excellent handling ability (tackiness properties), has been demanded.

PATENT DOCUMENTS

Patent Documents 1 and 2 describe that a prepreg having excellent handling ability (tackiness properties) at about room temperature can be obtained by blending an epoxy resin with a cyanate ester resin. Patent Document 3 describes that improved reactivity can be achieved by blending a cyanate ester resin with an amine compound. Patent Document 4 describes that both a good pot life at room temperature and fast curability that enables curing in a short time can be achieved by blending an epoxy resin with a cyanate ester resin and a liquid amine compound.
[Patent Document 1] JP 62-185720 A
[Patent Document 2] Japanese Translated PCT Patent Application Laid-open No. 2005-506394
[Patent Document 3] JP 2017-132896 A
[Patent Document 4] WO 2017/038603

SUMMARY OF THE INVENTION

However, the thermosetting resin compositions described in Patent Documents 1 and 2 exhibit poor reactivity between the epoxy resin and the cyanate ester compound, and therefore the curing time cannot be sufficiently shortened. In the mixture of the amine compound and the cyanate ester compound described in Patent Document 3, there are a large number of triazine ring structures formed by reaction of the cyanate ester resin alone, so that the mixture has excellent mechanical properties in a high-temperature environment after moisture absorption. However, its glass transition temperature after moisture absorption is insufficient. In the thermosetting resin composition described in Patent Document 4, its high reactivity causes a remarkable increase in the viscosity at a high temperature of more than 80° C., leading to poor workability and poor physical properties of the cured product in, for example, the resin kneading process, and the production process of an intermediate base material such as a prepreg, which is problematic. Moreover, the resulting cured product has insufficient mechanical properties and heat resistance in a high-temperature environment after moisture absorption.

In view of this, an object of the present invention is to provide a thermosetting resin composition having excellent mechanical properties and heat resistance in a high-temperature environment after moisture absorption, and having excellent reactivity that allows curing in a short time; a prepreg having excellent tackiness properties at room temperature; and a fiber reinforced composite material.

In order to solve the above problems, the thermosetting resin composition according to embodiments of the present invention has the following constitution:
a thermosetting resin composition comprising at least the following constituents [A] to [C]:
 [A] an epoxy resin containing two or more glycidyl groups;
 [B] a cyanate ester resin containing two or more cyanate groups; and
 [C] an amine compound;
the thermosetting resin composition satisfying the following conditions (1) and (2):

(1) 0.25≤the number of moles of glycidyl groups in the thermosetting resin composition/the number of moles of cyanate groups in the thermosetting resin composition≤1.5; and (2) 0.05≤the number of moles of active hydrogen contained in the amino groups in the thermosetting resin composition/the number of moles of cyanate groups in the thermosetting resin composition≤0.5.

The prepreg according to embodiments of the present invention has the following constitution:

a prepreg prepared by impregnating a reinforced fiber with the thermosetting resin composition.

The fiber reinforced composite material according to embodiments of the present invention has any of the following constitutions:

a fiber reinforced composite material prepared by curing of the prepreg, or a fiber reinforced composite material comprising: a reinforced fiber; and a cured resin prepared by curing the thermosetting resin composition.

In the thermosetting resin composition of the present invention, the amine compound of the constituent [C] is preferably an aromatic amine compound containing two or more amino groups.

In the thermosetting resin composition of the present invention, the amine compound of the constituent [C] is preferably solid at 25° C.

In the thermosetting resin composition of the present invention, the amine compound of the constituent [C] preferably contains diaminodiphenyl sulfone or diaminodiphenyl ketone.

In the thermosetting resin composition of the present invention, the epoxy resin containing two or more glycidyl groups of the constituent [A] preferably contains 40 to 100 parts by mass of a glycidyl amine epoxy resin having at least a tri-functionality with respect to 100 parts by mass of total epoxy resin.

In the thermosetting resin composition of the present invention, the cyanate ester resin containing two or more cyanate groups of the constituent [B] preferably contains 20 to 100 parts by mass of a cyanate ester resin represented by Formula (1):

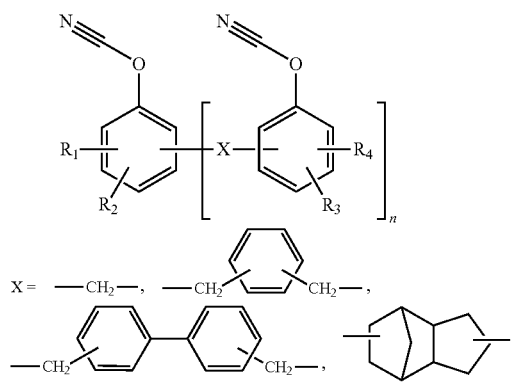

(1)

(wherein in Formula (1), $R_1$ to $R_4$ are each selected from at least one selected from the group consisting of a hydrogen atom, an aliphatic hydrocarbon group having 1 to 4 carbon atoms, an alicyclic hydrocarbon group having 4 or less carbon atoms, and a halogen atom; and n represents 2 to 20) with respect to 100 parts by mass of total cyanate ester resin.

The thermosetting resin composition of the present invention preferably further comprises a thermoplastic resin.

The thermosetting resin composition of the present invention preferably has an exothermic reaction peak of not less than 100 mW/g at 160° C. to 200° C. in an exothermic curve according to differential scanning calorimetry at a temperature ramp rate of 5° C./minute.

The thermosetting resin composition of the present invention preferably has a storage elastic modulus of 0.1 to 100,000 Pa at 30° C. according to a dynamic viscoelasticity test at a frequency of 0.5 Hz.

Since, in the present invention, an epoxy resin, a cyanate ester resin, and an amine compound are included, a cured thermosetting resin having excellent mechanical properties and heat resistance can be obtained. Common cured epoxy resins formed by reaction between an epoxy resin and an amine compound tend to exhibit high moisture absorption. In contrast, the cured thermosetting resin of the present invention exhibits low moisture absorption, and produces excellent mechanical properties and heat resistance even in a high-temperature environment after moisture absorption.

Further, due to the heat generated by the nucleophilic reaction of the amine compound to the cyanate ester resin, reaction between the epoxy resin and the cyanate ester resin is promoted, resulting in production of an effect that allows completion of the entire reaction in a short time. Further, by blending the cyanate ester resin with the epoxy resin and the amine compound, the crystallinity of the cyanate ester resin can be decreased, leading to good tackiness properties even at room temperature. Therefore, a prepreg prepared by impregnating a reinforced fiber with the thermosetting resin composition of the present invention exhibits good tackiness properties.

Compared to conventional fiber reinforced composite materials using, as a matrix resin, a cyanate ester resin containing no epoxy resin or amine compound, fiber reinforced composite materials prepared by curing of the thermosetting resin composition or prepreg of the present invention can be molded in a shorter time. Therefore, remarkable reduction of the molding time and molding cost is possible for applicable products such as aircraft structural members, windmill wings, automotive outer panels, and computer uses including IC trays and housings of notebook computers.

DETAILED DESCRIPTION OF EMBODIMENTS OF THE INVENTION

The thermosetting resin composition according to embodiments of the present invention has the following constitution.

A thermosetting resin composition comprising at least the following constituents [A] to [C]:

[A] an epoxy resin containing two or more glycidyl groups;

[B] a cyanate ester resin containing two or more cyanate groups; and

[C] an amine compound;

the thermosetting resin composition satisfying the following conditions (1) and (2):

(1) 0.25≤the number of moles of epoxy groups in the thermosetting resin composition/the number of moles of cyanate groups in the thermosetting resin composition≤1.5; and (2) 0.05≤the number of moles of active hydrogen contained in the amino groups in the thermosetting resin composition/the number of moles of cyanate groups in the thermosetting resin composition≤0.5.

The constituent [A] used in embodiments of the present invention is an epoxy resin containing two or more glycidyl groups. In cases where the number of the glycidyl groups is less than 2, the glass transition temperature of the cured thermosetting resin obtained by heat curing cannot be sufficiently high. Examples of the epoxy resin used in embodiments of the present invention include: bisphenol epoxy resins such as bisphenol A epoxy resins, bisphenol F epoxy resins, bisphenol AD epoxy resins, and bisphenol S epoxy resins; brominated epoxy resins such as tetrabromobisphenol A diglycidyl ether; epoxy resins having a biphenyl skeleton; epoxy resins having a naphthalene structure; epoxy resins having a dicyclopentadiene skeleton; novolac epoxy resins such as phenol novolac epoxy resins and cresol novolac epoxy resins; glycidyl amine epoxy resins such as N,N,O-triglycidyl-m-aminophenol, N,N,O-triglycidyl-p-aminophenol, N,N,O-triglycidyl-4-amino-3-methylphenol, N,N,N',N'-tetraglycidyl-4,4'-methylenedianiline, N,N,N',N'-tetraglycidyl-2,2'-diethyl-4,4'-methylenedianiline, N,N,N',N'-tetraglycidyl-m-xylylenediamine, N,N-diglycidyl aniline, and N,N-diglycidyl-o-toluidine; resorcin diglycidyl ether; and triglycidyl isocyanurate. In cases where the thermosetting resin composition of the present invention contains 40 to 100 parts by mass of a glycidyl amine epoxy resin containing three or more glycidyl groups, with respect to 100 parts by mass of total epoxy resin, a cured product having a high glass transition temperature and elastic modulus can be obtained, so that a more preferred mode can be achieved. Examples of the glycidyl amine epoxy resin containing three or more glycidyl groups include N,N,O-triglycidyl-m-aminophenol, N,N,O-triglycidyl-p-aminophenol, N,N,O-triglycidyl-4-amino-3-methylphenol, N,N,N',N'-tetraglycidyl-4,4'-methylenedianiline, N,N,N',N'-tetraglycidyl-2,2'-diethyl-4,4'-methylenedianiline, and N,N,N',N'-tetraglycidyl-m-xylylenediamine.

These epoxy resins may be used individually, or a plurality of the epoxy resins may be used in combination. In cases where an epoxy resin exhibiting fluidity at an arbitrary temperature and an epoxy resin exhibiting no fluidity at the arbitrary temperature are used in combination, the fluidity of the matrix resin during heat curing of the resulting prepreg can be effectively controlled. For example, during the heat curing, in cases where the fluidity of the matrix resin before the gelation is low, the orientation of the reinforced fiber is less likely to be disturbed, and the matrix resin is less likely to flow to the outside of the system, so that the fiber mass content can be easily controlled within a predetermined range. Thus, the resulting fiber reinforced composite material tends to exhibit good mechanical properties. Combination of a plurality of epoxy resins that exhibit various viscoelastic behaviors at arbitrary temperatures is effective also for achieving appropriate tackiness properties and drapability of the prepreg obtained.

The thermosetting resin composition of the present invention may be include, as appropriate, an epoxy resin other than the constituent [A], such as a monoepoxy resin having only one glycidyl group in the molecule, or an alicyclic epoxy resin, as long as the heat resistance and mechanical/physical properties are not remarkably deteriorated.

The constituent [B] contained in embodiments of the present invention is a cyanate ester resin containing two or more cyanate groups. In cases where the number of the cyanate groups is less than 2, the glass transition temperature of the cured thermosetting resin obtained by heat curing cannot be sufficiently high. Examples of the cyanate ester resin used in embodiments of the present invention include bisphenol A cyanate ester resins, bisphenol E cyanate ester resins, bisphenol F cyanate ester resins, cyanate ester resins having a biphenyl skeleton, cyanate ester resins having a naphthalene structure, cyanate ester resins having a dicyclopentadiene skeleton, phenol novolac cyanate ester resins, cresol novolac cyanate ester resins, phenol phenyl aralkyl cyanate ester resins, phenol biphenyl aralkyl cyanate ester resins, and naphthol phenyl aralkyl cyanate ester resins. In cases where the thermosetting resin composition of the present invention contains 20 to 100 parts by mass of a cyanate ester resin represented by Formula (1) with respect to 100 parts by mass of total cyanate ester resin, a cured product having a high glass transition temperature after moisture absorption can be obtained, so that a preferred mode can be achieved. These cyanate ester resins may be used individually, or a plurality of the cyanate ester resins may be used in combination.

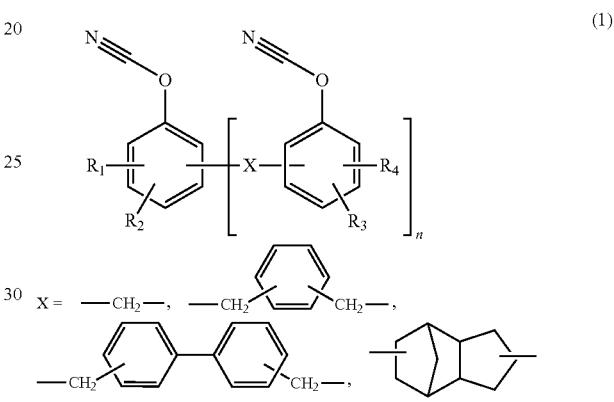

(wherein in Formula (1), $R_1$ to $R_4$ are each selected from at least one selected from the group consisting of a hydrogen atom, an aliphatic hydrocarbon group having 1 to 4 carbon atoms, an alicyclic hydrocarbon group having 4 or less carbon atoms, and a halogen atom; and n represents 2 to 20.)

The constituent [C] in embodiments of the present invention is an amine compound. In cases where the amine compound is solid at 25° C., a good pot life can be obtained in, for example, the resin kneading process, and the production process of an intermediate base material such as a prepreg, which is preferred. Further, in cases where the amine compound is an aromatic amine compound containing two or more amino groups, cross-linked structures can be formed, and the resulting chemical structure can be rigid, so that a cured thermosetting resin having a high glass transition temperature can be obtained, which is preferred. Examples of the constituent [C] include 3,3'-diisopropyl-4,4'-diaminodiphenylmethane, 3,3'-di-t-butyl-4,4'-diaminodiphenylmethane, 3,3',5,5'-tetraethyl-4,4'-diaminodiphenylmethane, 3,3'-diaminodiphenylmethane, 4,4'-diaminodiphenylmethane, 3,3'-diisopropyl-4,4'-diaminodiphenyl ketone, 3,3'-di-t-butyl-4,4'-diaminodiphenyl ketone, 3,3',5,5'-tetraethyl-4,4'-diaminodiphenyl ketone, 4,4'-diaminodiphenyl ketone, 3,3'-diaminodiphenyl ketone, 3,3'-diisopropyl-4,4'-diaminodiphenyl sulfone, 3,3'-di-t-butyl-4,4'-diaminodiphenyl sulfone, 3,3',5,5'-tetraethyl-4,4'-diaminodiphenyl sulfone, 4,4'-diaminodiphenyl sulfone, 3,3'-diaminodiphenyl sulfone, m-phenylenediamine, m-xylylenediamine, and diethyltoluenediamine.

In particular, diaminodiphenyl sulfone and diaminodiphenyl ketone enable achievement of a good pot life in, for example, the resin kneading process, and the production process of an intermediate base material such as a prepreg, since they have electron-withdrawing functional groups and hence are capable of moderately suppressing the nucleophilicity of the amine. Further, since diaminodiphenyl sulfone and diaminodiphenyl ketone have rigid chemical structures, a cured thermosetting resin having high heat resistance can be obtained, which is preferred. These amine compounds may be used individually, or a plurality of the amine compounds may be used in combination. When the amine compound is mixed with another component, the amine compound may be either in a powder form or a liquid form. A mixture of powder and liquid amine compounds may also be used.

The thermosetting resin composition according to embodiments of the present invention satisfies the following (1) and (2) at the same time:

(1) $0.25 \leq$ the number of moles of glycidyl groups in the thermosetting resin composition/the number of moles of cyanate groups in the thermosetting resin composition $\leq 1.5$; and (2) $0.05 \leq$ the number of moles of active hydrogen contained in the amino groups in the thermosetting resin composition/the number of moles of cyanate groups in the thermosetting resin composition $\leq 0.5$.

By reaction of the cyanate groups with the glycidyl groups in the epoxy resin, oxazolidone rings are formed, resulting in production of excellent mechanical properties and heat resistance even in a high-temperature environment after moisture absorption. Further, due to the heat generated by the nucleophilic reaction of the amine compound to the cyanate ester resin, reaction between the epoxy resin and the cyanate ester resin is promoted, to produce an effect that allows completion of the entire reaction in a short time. Further, by reaction of the amine compound with the cyanate ester resin, an isourea structure is formed, and the hydrogen bond property of the isourea structure allows improvement of the mechanical properties at room temperature. On the other hand, due to the hydrogen bond property of the isourea structure, the amount of moisture absorbed tends to increase. In cases where the ratio in (1) is less than 0.25, the prepreg has insufficient tackiness properties. On the other hand, in cases where the ratio is higher than 1.5, the mechanical properties and the heat resistance in a high-temperature environment after moisture absorption are insufficient.

In cases where the ratio in (2) is less than 0.05, the effect that improves reactivity of the thermosetting resin composition cannot be obtained, while in cases where the ratio is higher than 0.5, the increase in the viscosity at a high temperature of more than 80° C. cannot be suppressed, and the mechanical properties and the heat resistance in a high-temperature environment after moisture absorption are insufficient.

The number of moles of glycidyl groups contained in the epoxy resin of the constituent [A] herein is calculated as follows.

The number of moles of glycidyl groups contained in the epoxy resin of the constituent [A]=the number of parts by mass of the epoxy resin of the constituent [A]/the epoxy equivalent weight of the epoxy resin of the constituent [A].

In cases where the epoxy resin of the constituent [A] contains two or more epoxy resin components, the above-described number of moles is the sum of the numbers of moles of epoxy groups of those components. For example, when the epoxy resin of the constituent [A] contains component 1 and component 2, the calculation is performed as follows.

The number of moles of glycidyl groups contained in the epoxy resin of the constituent [A]=the number of parts by mass of the epoxy resin of component 1/the epoxy equivalent weight of the epoxy resin of component 1+the number of parts by mass of the epoxy resin of component 2/the epoxy equivalent weight of the epoxy resin of component 2.

Further, the number of moles of cyanate groups contained in the cyanate ester resin of the constituent [B] is calculated as follows.

The number of moles of cyanate groups contained in the cyanate ester resin of the constituent [B]=the number of parts by mass of the cyanate ester resin of the constituent [B]/the cyanate equivalent weight of the cyanate ester resin of the constituent [B].

The number of moles of active hydrogen of the amine compound of the constituent [C] is calculated as follows.

The number of moles of active hydrogen of the amine compound of the constituent [C]=the number of parts by mass of the amine compound of the constituent [C]/the active hydrogen equivalent of the amine compound of the constituent [C].

The epoxy equivalent weight herein means the value determined by the method described in JIS K 7236-2009. The active hydrogen equivalent means the amine number determined by the method described in JIS K 7237-1995. The cyanate equivalent weight means the cyanate equivalent weight calculated by identifying the chemical structure and its ratio by liquid chromatography mass spectrometry (LC/MS method).

The amine compound of the constituent [C] in the present invention may be used in combination with another curing accelerator as long as the heat resistance and thermal stability of the thermosetting resin composition are not deteriorated. Examples of the other curing accelerator include cationic polymerization initiators, tertiary amines, imidazole compounds, urea compounds, and hydrazide compounds.

The thermosetting resin composition of the present invention preferably further contains a thermoplastic resin. The thermoplastic resin is included in order to control tackiness properties of the prepreg obtained, to control the fluidity of the matrix resin during heat curing of the prepreg, and to give toughness to the resulting fiber reinforced composite material without deteriorating its heat resistance and elastic modulus. From the viewpoint of control of the viscoelasticity of the thermosetting resin composition, and control of the tackiness properties of the prepreg, the amount of the thermoplastic resin contained in the thermosetting resin composition is preferably 1 to 30% by mass. The thermoplastic resin is preferably a thermoplastic resin constituted by a polyarylether skeleton. Examples of the thermoplastic resin include polysulfone, polyphenylsulfone, polyethersulfone, polyetherimide, polyphenylene ether, polyetheretherketone, and polyetherethersulfone. These thermoplastic resins constituted by a polyarylether skeleton may be used either individually or as a combination as appropriate. In particular, polyethersulfone and polyetherimide may be preferably used since they are capable of giving toughness to the resulting fiber reinforced composite material without deteriorating its heat resistance and mechanical/physical properties.

These thermoplastic resins constituted by a polyarylether skeleton may contain a terminal functional group such as a primary amine, secondary amine, hydroxy group, carboxyl group, thiol group, acid anhydride, or halogen group (chlorine or bromine). Among these, in cases of a halogen group having low reactivity with the epoxy resin, a prepreg having excellent preservation stability can be obtained. On the other hand, in cases of a functional group other than halogen groups, it is reactive with the epoxy resin and the cyanate ester resin, so that a thermosetting resin composition that exhibits excellent adhesion to a thermoplastic resin can be obtained, which is preferred.

The thermosetting resin composition of the present invention preferably has an exothermic reaction peak of not less than 100 mW/g within the range of 160° C. to 200° C., more preferably 180° C. to 200° C., in an exothermic curve according to differential scanning calorimetry at a temperature ramp rate of 5° C./minute. In cases where the exothermic reaction peak is present at not less than 160° C., the increase in the viscosity at a high temperature of more than 80° C. can be suppressed, and a good pot life can be obtained. In cases where the exothermic reaction peak is present at not more than 200° C., the reactivity can be improved, and the curing can be completed in a short time.

After retention at 80° C. for 120 minutes, the thermosetting resin composition of the present invention has a viscosity which is preferably 1.0 to 3.0 times higher, more preferably 1.0 to 2.0 times higher, than the initial viscosity at 80° C. For determination of the viscosity increase ratio after retention at 80° C. for 120 minutes, the viscosity after retention at 80° C. for 1 minute (the initial viscosity at 80° C.), $\eta^*_i$, is measured, and then the viscosity after retention at 80° C. for 120 minutes, $\eta^*_{120}$, is measured. The viscosity increase ratio is then determined as follows: $\eta^*_{120}/\eta^*_1$. The viscosity herein means the complex viscosity $\eta^*$ as measured using a dynamic viscoelasticity measurement apparatus (ARES rheometer, manufactured by TA Instruments) with parallel plates having a diameter of 40 mm at a frequency of 0.5 Hz with a gap of 1 mm.

The viscosity increase ratio after the retention at 80° C. can be an index of the pot life of the thermosetting resin composition in the kneading process of the resin composition and the production process of the prepreg. More specifically, the smaller the viscosity increase ratio after the retention at 80° C., the better the pot life. In cases where the viscosity increase ratio of the thermosetting resin composition after retention at 80° C. for 120 minutes is 1.0 to 3.0, the resin composition has high thermal stability, and the impregnating property of the resin into the reinforced fiber does not decrease in the prepreg production process, so that voids are less likely to be formed in the molded product.

Since the tackiness properties of the prepreg are affected by the contact area on fine irregularities of the surface of the adherend, a low storage elastic modulus of the matrix resin composition leads to improvement of the tackiness properties due to an increase in the contact area. In cases where the storage elastic modulus at 30° C. is 0.1 Pa to 100,000 Pa in measurement of the dynamic viscoelasticity at a frequency of 0.5 Hz, the prepreg can have excellent tackiness properties, leading to good adhesion between the prepreg and a metal, or between prepregs.

In the cases of application to structural materials for use in the aerospace, the materials have high surface temperature due to air friction, and absorb moisture in the clouds. Therefore, the materials are required to have excellent mechanical properties and heat resistance even in a high-temperature environment after moisture absorption. The mechanical properties of a cured thermosetting resin in a high-temperature environment after moisture absorption herein means the elastic modulus evaluated by immersing a test piece in hot water at 98° C. for 48 hours followed by performing a 3-point bending test in an environment at 82° C. The cured product obtained from the thermosetting resin composition of the present invention has an elastic modulus of preferably not less than 3.0 GPa, more preferably not less than 3.2 GPa in a high-temperature environment after moisture absorption. The upper limit of the elastic modulus in a high-temperature environment after moisture absorption is not limited, and preferably as high as possible. Normal cured thermosetting resins have an upper limit of 7.0 GPa. As the flexural modulus of the cured thermosetting resin increases, better mechanical properties can be achieved as the fiber reinforced composite material, which is preferred.

The heat resistance of the cured product after moisture absorption means the glass transition temperature evaluated by immersing a test piece in hot water at 98° C. for 48 hours followed by performing a dynamic viscoelasticity test. The cured product obtained from the thermosetting resin composition of the present invention has a glass transition temperature of preferably not less than 180° C., more preferably not less than 190° C., after moisture absorption. The upper limit of the glass transition temperature of the cured product after moisture absorption is not limited, and preferably as high as possible. Normal cured thermosetting resins have an upper limit of 400° C. As the glass transition temperature of the cured thermosetting resin increases, the resin becomes applicable to members requiring higher heat resistance, which is preferred.

In the present invention, inclusion of particles containing a thermoplastic resin as a major component is also preferred. By the inclusion of the thermoplastic resin particles, impact resistance of the resulting fiber reinforced composite material can be improved since the resin layer (which may be hereinafter referred to as "interlayer resin layer") formed between layers composed of reinforced fibers in the fiber reinforced composite material can have improved toughness.

As the thermoplastic resin particles, a thermoplastic resin that can be used by mixing in a thermosetting resin composition may be used. The thermoplastic resin is most preferably a polyamide. Among polyamides, polyamide 12, polyamide 6, polyamide 11, and polyamide 6/12 copolymer; and polyamides modified with the epoxy compounds described in Examples 1 to 7 of JP 2009-221460 A into semi IPNs (macromolecular interpenetrating network structures) (semi IPN polyamides); give especially good adhesive strength for adhesion to the thermosetting resin. The thermoplastic resin particles may be in the form of spherical particles or nonspherical particles, and may be in the form of porous particles. In a preferred mode, the thermoplastic resin particles are spherical from the viewpoint of the facts that the spherical particles do not deteriorate the resin flow property, and hence an excellent viscoelasticity can be achieved, and that a high impact resistance can be imparted because of the absence of sources of stress concentration. Examples of commercially available products of polyamide particles that may be used include SP-500, SP-10, TR-1, TR-2, 842P-48, and 842P-80 (which are manufactured by Toray Industries, Inc.); and "Orgasol (registered trademark)" 1002D, 2001UD, 2001EXD, 2002D, 3202D, 3501D, and 3502D (which are manufactured by Arkema). These types of polyamide particles may be used individually, or a plurality of types thereof may be used in combination.

The thermosetting resin composition of the present invention may contain: a coupling agent; thermosetting resin particles; an inorganic filler such as silica gel, carbon black, clay, carbon nanotubes, graphene, carbon particles, or a metal powder; or the like; as long as the effect of the present invention is not deteriorated.

The prepreg according to embodiments of the present invention is prepared by combining the thermosetting resin composition with a reinforced fiber, which resin composition is used as a matrix resin. Preferred examples of the reinforced fiber include carbon fibers, graphite fibers, aramid fibers, and glass fibers. Carbon fibers are especially preferred.

Examples of commercially available products of the carbon fibers include "TORAYCA" (registered trademark) T800G-24K, "TORAYCA" (registered trademark) T800S-24K, "TORAYCA" (registered trademark) T700G-24K, "TORAYCA" (registered trademark) T300-3K, and "TORAYCA" (registered trademark) T700S-24K (which are manufactured by Toray Industries, Inc.).

Regarding the form and array of the carbon fibers, the carbon fibers may be appropriately selected from unidirectionally arranged long fibers, woven fabrics, and the like. For obtaining a lightweight carbon fiber reinforced material having a higher level of durability, the carbon fibers are preferably in the form of continuous fibers such as unidirectionally arranged long fibers (fiber bundles) or a woven fabric.

The prepreg of the present invention may be produced by various known methods. For example, the prepreg may be produced by a method such as a wet process in which the viscosity of a matrix resin is reduced by dissolving it in an organic solvent selected from acetone, methyl ethyl ketone, methanol, and the like, and then a reinforced fiber is impregnated therewith, or a hot-melt process in which the viscosity of a matrix resin is reduced by heating without using an organic solvent, and then a reinforced fiber is impregnated therewith.

In the wet process, the reinforced fiber is immersed in a liquid containing the matrix resin, and the fiber is then collected, followed by evaporating the organic solvent using an oven or the like. By this, the prepreg can be obtained.

The hot-melt process may employ, for example, a method in which the reinforced fiber is directly impregnated with a matrix resin whose viscosity is reduced by heating, or a method in which a release paper or the like is coated with a matrix resin to prepare a release paper sheet having a resin film (which may be hereinafter referred to as "resin film") in advance, and then the resin film is disposed on the reinforced fiber from one or both sides of the reinforced fiber, followed by applying heat and pressure thereto to impregnate the reinforced fiber with the matrix resin.

The method of producing the prepreg of the present invention is preferably a hot-melt process, in which the reinforced fiber is impregnated with the matrix resin without using an organic solvent, since substantially no organic solvent remains in the prepreg in this method.

In the prepreg of the present invention, the amount of reinforced fibers per unit area is preferably 30 to 2000 g/m$^2$. In cases where the amount of reinforced fibers is not less than 30 g/m$^2$, the number of layers for obtaining a predetermined thickness in the molding of the fiber reinforced composite material can be reduced, so that the operation tends to be simple. On the other hand, in cases where the amount of reinforced fibers is not more than 2000 g/m$^2$, the prepreg tends to have improved drapability.

The fiber mass content of the prepreg of the present invention is preferably 30 to 90% by mass, more preferably 35 to 85% by mass, still more preferably 40 to 80% by mass. In cases where the fiber mass content is not less than 30% by mass, the amount of resin is not too large, and advantages of the fiber reinforced composite material having an excellent specific strength and specific elastic modulus can be easily obtained. Moreover, in the molding of the fiber reinforced composite material, the amount of heat generated upon the curing tends not to be too high. In cases where the fiber mass content is not more than 90% by mass, defective impregnation with the resin tends not to occur, so that the resulting fiber reinforced composite material tends to have less voids.

The first mode of the fiber reinforced composite material of the present invention is produced by curing of the prepreg of the present invention. One example of the production method is a method in which the prepreg of the present invention is laminated into a predetermined form, and pressure and heat are applied thereto to cure the resin. Examples of the method employed for the application of heat and pressure herein include the press forming method, autoclave molding method, bag molding method, wrapping tape method, and internal pressure molding method.

The second mode of the fiber reinforced composite material of the present invention comprises: a reinforced fiber; and a cured thermosetting resin prepared by curing the thermosetting resin composition described above. The fiber reinforced composite material in this mode may be prepared, without using a prepreg, by a method in which the reinforced fiber is directly impregnated with the thermosetting resin composition of the present invention, and then heat curing is carried out. Examples of the method include molding methods such as the hand lay-up method, filament winding method, pultrusion method, resin injection molding method, and resin transfer molding method.

EXAMPLES

The present invention is described below in more detail by way of Examples. However, the scope of the present invention is not limited to these Examples. The unit of the composition ratio "parts" means parts by mass unless otherwise specified. Unless otherwise specified, the measurement of properties was carried out in an environment at a temperature of 23° C. and a relative humidity of 50%.

<Materials Used in Examples and Comparative Examples>

(1) Constituent [A]: Epoxy Resin Containing Two or More Glycidyl Groups

Bisphenol A epoxy resin ("jER" (registered trademark) 828, manufactured by Mitsubishi Chemical Corporation; epoxy equivalent weight, 189 (g/eq.); number of glycidyl groups, 2)

Bisphenol F epoxy resin ("EPICLON" (registered trademark) 830, manufactured by DIC Corporation; epoxy equivalent weight, 172 (g/eq.); number of glycidyl groups, 2)

Tetraglycidyl diaminodiphenylmethane ("Araldite" (registered trademark) MY721, manufactured by Huntsman Advanced Materials; epoxy equivalent weight, 113 (g/eq.); number of glycidyl groups, 4)

Triglycidyl-m-aminophenol ("Araldite" (registered trademark) MY0600, manufactured by Huntsman Advanced Materials; epoxy equivalent weight, 106 (g/eq.); number of glycidyl groups, 3)

Triglycidyl-p-aminophenol ("Araldite" (registered trademark) MY0500, manufactured by Huntsman Advanced Materials; epoxy equivalent weight, 106 (g/eq.); number of glycidyl groups, 3)

Phenol novolac epoxy resin ("jER" (registered trademark) 154, manufactured by Mitsubishi Chemical Corporation; epoxy equivalent weight, 178 (g/eq.))

(2) Constituent [B]: Cyanate Ester Resin Containing Two or More Cyanate Groups
- Bisphenol A isocyanate ester resin ("CYTESTER" (registered trademark) TA, manufactured by Mitsubishi Gas Chemical Company, Inc.; cyanate equivalent weight, 139 (g/eq.))
- Phenol novolac cyanate ester resin ("AroCy" (registered trademark) XU371, manufactured by Huntsman Advanced Materials; cyanate equivalent weight, 131 (g/eq.); cyanate ester resin included in the structure of Formula (1))

(3) Constituent [C]: Amine Compound
- 4,4'-Diaminodiphenyl sulfone (Seikacure S, manufactured by Wakayama Seika Kogyo Co., Ltd.; active hydrogen equivalent, 62 (g/eq.); solid at 25° C.; aromatic amine compound containing two or more amino groups)
- 3,3'-Diaminodiphenyl sulfone (3,3'-DAS, manufactured by Mitsui Fine Chemicals, Inc.; active hydrogen equivalent, 62 (g/eq.); solid at 25° C.; aromatic amine compound containing two or more amino groups)
- 4,4'-Diaminodiphenyl ketone (manufactured by Wakayama Seika Kogyo Co., Ltd.; active hydrogen equivalent, 53 (g/eq.); solid at 25° C.; aromatic amine compound containing two or more amino groups)
- 3,3'-Diaminodiphenyl ketone (manufactured by Tokyo Chemical Industry Co., Ltd.; active hydrogen equivalent, 53 (g/eq.); solid at 25° C.; aromatic amine compound containing two or more amino groups)
- Diethyltoluenediamine ("Aradur" (registered trademark) 5200, manufactured by Huntsman Advanced Materials; active hydrogen equivalent, 45 (g/eq.); liquid at 25° C.; aromatic amine compound containing two or more amino groups)
- 4,4'-diamino-3,3'-diethyldiphenylmethane ("Kayahard" (registered trademark) A-A, manufactured by Nippon Kayaku Co., Ltd.; active hydrogen equivalent, 64 (g/eq.); liquid at 25° C.; aromatic amine compound containing two or more amino groups)
- Dicyandiamide (DICY7, manufactured by Mitsubishi Chemical Corporation); solid at 25° C.; aliphatic amine compound)

(4) Thermoplastic Resin
- Polyethersulfone ("Virangage" (registered trademark) VW-10700RP, manufactured by SOLVAY)

(5) Curing Accelerator
- Tetraphenylphosphonium tetra-p-tolylborate ("TPP-MK" (registered trademark), manufactured by Hokko Chemical Industry Co., Ltd.)

<Preparation Methods and Evaluation Methods for Thermosetting Resin Compositions>

By the following methods, measurement was carried out for the thermosetting resin compositions of Examples and Comparative Examples.

(1) Preparation of Thermosetting Resin Compositions

Epoxy resins corresponding to the constituent [A], cyanate ester resins corresponding to the constituent [B], and a thermoplastic resin were fed to a kneading machine as described in Tables 1 to 6, and heated and kneaded to dissolve the thermoplastic resin. Subsequently, while the kneading was continued, the temperature was decreased to not more than 100° C., and the constituent [C] or curing accelerator described in Tables 1 to 5 was added thereto (however, in some Comparative Examples, the constituent [A], constituent [B], and/or constituent [C], was/were not added), followed by stirring the resulting mixture, to obtain each thermosetting resin composition.

(2) Method of Measuring Exothermic Reaction Peak Temperature of Thermosetting Resin Composition An exothermic curve of each thermosetting resin composition was obtained using a differential scanning calorimeter (DSC Q2000, manufactured by TA Instruments) in a nitrogen atmosphere at a temperature ramp rate of 5° C./minute. In the exothermic curve obtained, the peak top temperature of an exothermic reaction peak at which the amount of heat generated was not less than 100 mW/g was regarded as the exothermic reaction peak temperature. In cases where there were two or more peaks at which the amount of heat generated was not less than 100 mW/g, the temperature for the peak top in the low-temperature side was regarded as the exothermic reaction peak temperature. Concerning evaluation of the fast curability, the exothermic reaction peak temperature is represented in Tables 1 to 6 as follows: A, not more than 180° C.; B, more than 180° C. and not more than 200° C.; C, more than 200° C. and not more than 220° C.; D, more than 220° C.

(3) Method of Measuring Viscosity Increase Ratio after Retention of Thermosetting Resin Composition at 80° C. for 120 Minutes The viscosity of the thermosetting resin composition was evaluated using a dynamic viscoelasticity measurement apparatus ARES rheometer (manufactured by TA Instruments). Flat parallel plates having a diameter of 40 mm were used as the upper and lower measuring jigs. The thermosetting resin composition was placed such that the distance between the upper and lower jigs was 1 mm, and measurement was carried out in the torsion mode (measurement frequency, 0.5 Hz), to obtain the complex viscosity $\eta^*$, which was regarded as the viscosity. The viscosity after retention at 80° C. for 1 minute, $\eta^*_1$, and the viscosity after retention at 80° C. for 120 minutes, $\eta^*_{120}$, were measured, and the viscosity increase ratio (pot life) was calculated according to $\eta^*_{120}/\eta^*_1$. Concerning the evaluation of the pot life, the viscosity increase ratio is represented in Tables 1 to 6 as follows: A, not more than 2.0; B, more than 2.0 and not more than 2.5; C, more than 2.5 and not more than 3.0; D, more than 3.0.

(4) Measurement of Storage Elastic Modulus of Thermosetting Resin Composition

The storage elastic modulus of the thermosetting resin composition was evaluated using a dynamic viscoelasticity apparatus ARES rheometer (manufactured by TA Instruments). Flat parallel plates having a diameter of 40 mm were used as the upper and lower measuring jigs. The thermosetting resin composition was placed such that the distance between the upper and lower jigs was 1 mm, and measurement was carried out in the torsion mode (measurement frequency, 0.5 Hz). The storage elastic modulus after retention at 30° C. for 1 minute was calculated as the 30° C.-storage elastic modulus.

(5) Method of Preparing Cured Thermosetting Resin

The thermosetting resin composition prepared in (1) was injected into a mold, and, in a hot air dryer, the temperature was increased from 30° C. at a rate of 1.5° C./minute, and then heat curing was allowed at 210° C. for 8 hours, followed by decreasing the temperature to 30° C. at a rate of 2.5° C./minute, to prepare a plate-like cured resin having a thickness of 2 mm.

(6) Method of Measuring Glass Transition Temperature of Cured Thermosetting Resin Under Dry Conditions or Moisture Absorption Conditions From the cured resin plate prepared by the method of (5), a test piece having a width of 12.7 mm and a length of 45 mm was cut out, and, in the case of measurement under dry conditions, the test piece was dried in a vacuum oven at 60° C. for 24 hours, followed by performing a dynamic viscoelasticity test according to JIS K 7244, to determine the glass transition temperature. In the case of measurement under moisture absorption conditions, the test piece was immersed in hot water at 98° C. for 48 hours, and then a dynamic viscoelasticity test was similarly carried out to determine the glass transition temperature. In the storage elastic modulus curve, the temperature at the point of intersection between the tangent drawn for the glass region and the tangent drawn for the transition region was regarded as the glass transition temperature. The measurement was carried out at a temperature ramp rate of 5° C./minute and a frequency of 1 Hz. Concerning the heat resistance after moisture absorption, the glass transition temperature after moisture absorption is represented in Tables 1 to 6 as follows: A, not less than 190° C.; B, not less than 180° C. and less than 190° C.; C, not less than 170° C. and less than 180° C.; D, less than 170° C.

(7) Method of Measuring Flexural Modulus of Cured Thermosetting Resin in Room Temperature Environment after Drying or in High-Temperature Environment after Moisture Absorption From the cured resin plate prepared by the method of (5), a test piece having a length of 60 mm and a width of 10 mm was cut out, and a 3-point bending test was carried out using a universal material tester (manufactured by Instron Japan Co., Ltd., "Instron" (registered trademark) Type 5565, P8564) at a test speed of 2.5 mm/minute at a distance between supporting points of 32 mm, to determine the flexural modulus according to JIS K 7171-1994. In the case of measurement at room temperature after drying, the test piece was dried in a vacuum oven at 60° C. for 24 hours, followed by performing the test at an ambient temperature of 25° C. In the case of measurement in a high-temperature environment after moisture absorption, the test piece was immersed in hot water at 98° C. for 48 hours, followed by performing the test at an ambient temperature of 82° C. Concerning the mechanical properties in a high-temperature environment after moisture absorption, the flexural modulus at 82° C. after moisture absorption is represented in Tables 1 to 6 as follows: A, not less than 3.2 GPa; B, not less than 3.0 GPa and less than 3.2 GPa; C, not less than 2.8 GPa and less than 3.0 GPa; D, less than 2.8 GPa.

(8) Method of Preparation of Prepreg

A release paper was coated with the thermosetting resin composition prepared in (1), to prepare a resin film having a predetermined resin areal weight. This resin film was set in a prepreg preparation apparatus, and disposed on both sides of arranged reinforced fibers, followed by application of heat and pressure thereto to impregnate the fibers with the thermosetting resin composition, to prepare a prepreg having a fiber areal weight of 192 g/m² and a resin content of 35% by mass. As the reinforced fiber, a carbon fiber ("TORAYCA" (registered trademark) T700S-24K, manufactured by Toray Industries, Inc.; number of fibers, 24,000; tensile strength, 4900 MPa; tensile modulus, 230 MPa) was used.

(9) Method of Evaluating Tackiness Properties of Prepreg

The prepreg prepared in (8) was cut out into sheets of 15 cm×15 cm and 10 cm×10 cm, and the sheets were stacked such that the 15 cm×15 cm prepreg was placed in the lower side, and such that the 10 cm×10 cm prepreg was placed in the upper side. A stainless steel plate (400 g) of 10 cm×10 cm with an adhesive tape attached thereto was placed on the top of the stacked prepregs, and left to stand for 30 seconds. The stainless steel plate was then lifted up. At that time, in the cases where the stacked prepregs did not split from each other, the tackiness properties were rated as "good", while in the cases where the stacked prepregs split from each other, the tackiness properties were rated as "poor".

Examples 1 to 4 and Comparative Examples 1, 8, and 9

Examples 1 to 4, as a result of use of the amine compound described in Table 1 as the constituent [C], achieved remarkably low exothermic reaction peak temperatures while maintaining good viscosity increase ratios after retention at 80° C. for 2 hours, compared to Comparative Example 1 (containing no constituent [C]), which is shown in Table 5. Thus, Examples 1 to 4 exhibited excellent fast curability. Moreover, Examples 1 to 4, compared to Comparative Example 1, had improved flexural moduli in the environment at 82° C. after moisture absorption due to the hydrogen bond property of the isourea structure formed by reaction between amine and cyanate, indicating excellent mechanical properties.

As shown in Tables 1 and 5, in Examples 1 to 4 and Comparative Examples 8 and 9, when the ratio of the number of moles of active hydrogen contained in the amino groups to the number of moles of cyanate groups in the thermosetting resin composition was changed while the ratio of the number of moles of glycidyl groups to the number of moles of cyanate groups in the thermosetting resin composition was set constant, the exothermic reaction peak temperature tended to decrease, and the fast curability tended to increase, as the ratio of the number of moles of active hydrogen increased. Further, although the glass transition temperature after moisture absorption tended to decrease, and the viscosity increase ratio after retention at 80° C. for 2 hours tended to increase, all of Examples 1 to 4 exhibited non-problematic, excellent physical properties. In Comparative Example 8, in which the ratio of the number of moles of active hydrogen contained in the amino groups to the number of moles of cyanate groups in the thermosetting resin composition is 0.02, the exothermic reaction peak temperature was high, and hence the fast curability was insufficient. In Comparative Example 9, in which the ratio of the number of moles of active hydrogen contained in the amino groups to the number of moles of cyanate groups in the thermosetting resin composition is 0.6, the glass transition temperature after moisture absorption was low, and the viscosity increase ratio after retention at 80° C. for 2 hours was high, indicating a poor pot life, compared to Examples 1 to 4.

Examples 5 to 8 and Comparative Example 2

As shown in Tables 1 and 5, Examples 5 to 8 and Comparative Example 2 were prepared in the same manner as Examples 1 to 4 and Comparative Example 1 except that a bisphenol A epoxy resin was used instead of tetraglycidyl diaminodiphenylmethane as the epoxy resin of the constituent [A]. Examples 5 to 8 achieved remarkably low exothermic reaction peak temperatures while maintaining good viscosity increase ratios after retention at 80° C. for 2 hours, compared to Comparative Example 2 (containing no constituent [C]). Thus, Examples 5 to 8 exhibited excellent fast curability. Moreover, Examples 5 to 8, compared to Comparative Example 2, had improved flexural moduli in the environment at 82° C. after moisture absorption, indicating excellent mechanical properties.

Examples 2 and 9 to 11, and Comparative Examples 6, 7, and 10 to 12

As shown in Tables 1, 2, and 5, in Examples 2 and 9 to 11, and Comparative Examples 6 and 7, tetraglycidyl diaminodiphenylmethane was used as the epoxy resin of the constituent [A], and the ratio of the number of moles of glycidyl groups to the number of moles of cyanate groups in the thermosetting resin composition was changed while the ratio of the number of moles of active hydrogen contained in the amino groups to the number of moles of cyanate groups in the thermosetting resin composition was set constant. As the ratio of the number of moles of glycidyl groups increased, the viscosity increase ratio after retention at 80° C. for 2 hours tended to decrease, indicating an excellent pot life. In Comparative Example 6, in which the ratio of the number of moles of glycidyl groups to the number of moles of cyanate groups in the thermosetting resin composition is 0.2, the glass transition temperature after moisture absorption was lower than in Examples 2 and 9 to 11, and the thermosetting resin composition was solid at 30° C. Thus, Comparative Example 6 did not exhibit tackiness as a prepreg. In Comparative Example 7, in which the ratio of the number of moles of glycidyl groups to the number of moles of cyanate groups in the thermosetting resin composition is 1.75, the glass transition temperature after moisture absorption and the flexural modulus in the environment at 82° C. after moisture absorption were lower than in Examples 2 and 9 to 11.

As shown in Tables 5 and 6, Comparative Examples 10 to 12, which do not contain the constituent [C], exhibited much higher exothermic reaction peak temperatures compared to Examples 9 to 11, which contain the constituent [C]. Thus, Comparative Examples 10 to 12 exhibited insufficient fast curability.

Examples 6 and 12 to 14, and Comparative Examples 2 and 13 to 15

As shown in Tables 1 and 2, in Examples 6 and 12 to 14, a bisphenol A epoxy resin was used as the epoxy resin of the constituent [A], and the ratio of the number of moles of glycidyl groups to the number of moles of cyanate groups in the thermosetting resin composition was changed while the ratio of the number of moles of active hydrogen contained in the amino groups to the number of moles of cyanate groups in the thermosetting resin composition was set constant. As the ratio of the number of moles of glycidyl groups increased, the viscosity increase ratio after retention at 80° C. for 2 hours tended to decrease, indicating an excellent pot life. As shown in Tables 5 and 6, Comparative Examples 2 and 13 to 15, which do not contain the constituent [C], exhibited much higher exothermic reaction peak temperatures compared to Examples 6 and 12 to 14, which contain the constituent [C]. Thus, Comparative Examples 2 and 13 to 15 exhibited insufficient fast curability.

Examples 2, 6, and 15 to 18

As shown in Tables 1 and 2, in Examples 2, 6, and 15 to 18, the blending ratio between tetraglycidyl diaminodiphenylmethane and the bisphenol A epoxy resin was changed while the ratio of the number of moles of active hydrogen contained in the amino groups to the number of moles of cyanate groups in the thermosetting resin composition, and the ratio of the number of moles of glycidyl groups to the number of moles of cyanate groups in the thermosetting resin composition, were set constant. As the amount of tetraglycidyl diaminodiphenylmethane, which is a glycidyl amine epoxy resin having at least a tri-functionality, blended increased, the glass transition temperature in the dry state and the glass transition temperature after moisture absorption largely increased, exhibiting favorable properties.

Examples 1 to 3 and Comparative Examples 3 to 5

As shown in Table 5, in Comparative Examples 3 to 5, the thermosetting resin composition was solid at 30° C., and therefore measurement of the storage elastic modulus was impossible, since they do not contain the epoxy resin of the constituent [A]. Moreover, the prepregs prepared did not show tackiness properties. Examples 1 to 3, which contain the constituent [A], exhibited higher flexural moduli in the environment at 82° C. after moisture absorption, and higher glass transition temperatures after moisture absorption, indicating excellent properties, compared to Comparative Examples 3 to 5.

Examples 19 to 22 and Comparative Examples 16 to 19

As shown in Tables 2 and 3, Examples 19 to 22, as a result of use of various epoxy resins as the constituent [C], achieved remarkably low exothermic reaction peak temperatures while maintaining good viscosity increase ratios after retention at 80° C. for 2 hours, compared to Comparative Examples 16 to 19 (containing no constituent [C]), which are shown in Table 6. Thus, Examples 19 to 22 exhibited excellent fast curability.

Examples 2 and 23 to 26

As shown in Table 3, in Examples 23 to 26, the ratio of the number of moles of active hydrogen contained in the amino groups to the number of moles of cyanate groups in the thermosetting resin composition, and the ratio of the number of moles of glycidyl groups to the number of moles of cyanate groups in the thermosetting resin composition, were the same as in Example 2, but the blending ratio between the phenol novolac cyanate ester resin (included in the structure of Formula (1)) and the bisphenol A cyanate ester resin was changed. As the amount of the phenol novolac cyanate ester resin (included in the structure of Formula (1)) blended increased, the glass transition temperature after moisture absorption largely increased, indicating excellent properties.

Examples 27 to 30

As shown in Table 3, in Examples 27 to 30, the phenol novolac cyanate ester resin was included at not less than 20 parts by mass with respect to the total cyanate ester resin, and the ratio of the number of moles of active hydrogen contained in the amino groups to the number of moles of cyanate groups in the thermosetting resin composition, or the ratio of the number of moles of glycidyl groups to the number of moles of cyanate groups in the thermosetting resin composition, was changed from Examples 23 and 24. All of these Examples exhibited excellent glass transition temperatures after moisture absorption, indicating excellent properties.

Examples 31 to 36

As shown in Table 4, all of Examples 31 to 36, as a result of use of various amine compounds as the constituent [C], achieved remarkably low exothermic reaction peak temperatures compared to Comparative Example 1 (containing no constituent [C]), which is shown in Table 5. Thus, Examples 31 to 36 exhibited excellent fast curability. In Examples 31 to 33, in which diaminodiphenyl sulfone or diaminodiphenyl ketone was used as the constituent [C], the nucleophilicity of the amine was moderately suppressed since they have electron-withdrawing functional groups. Thus, they exhibited especially excellent balances between the pot life and the fast curability. Moreover, due to the rigidity of the skeleton of the diaminodiphenyl sulfone or diaminodiphenyl ketone, they exhibited especially excellent glass transition temperatures after moisture absorption.

Comparative Examples 20 and 21

As shown in Table 6, Comparative Example 20, which does not contain the constituent [B], was prone to moisture absorption due to the hydrophilicity of the hydroxy group formed by reaction between the glycidyl group and the amino group, so that the flexural modulus in the environment at 82° C. after moisture absorption was much lower than that of Example 1, which contains the constituent [B].

Comparative Example 21, which contains neither the constituent [A] nor the constituent [C], exhibited a much lower glass transition temperature after moisture absorption than Example 1. Moreover, the thermosetting resin composition of Comparative Example 21 was solid at 30° C., and hence did not exhibit tackiness properties as a prepreg.

Examples 1 and 37

As shown in Table 4, Example 37, which does not contain a thermoplastic resin, tended to have a low storage elastic modulus at 30° C. However, it exhibited favorable tackiness properties as a prepreg.

TABLE 1

| | | | Example 1 | Example 2 | Example 3 | Example 4 | Example 5 | Example 6 |
|---|---|---|---|---|---|---|---|---|
| Thermosetting Resin Composition | Constituent [A] Epoxy Resin | | | | | | | |
| | | Tetra Glycidyl Diaminodiphenylmethane ("Araldite" ®MY721) | 60 | 60 | 60 | 60 | | |
| | | Bisphenol A type epoxy ("jER" ®828) | | | | | 102 | 102 |
| | | Bisphenol F type epoxy ("EPICLON" ®830) | | | | | | |
| | | Tri Glycidyl -m-Amino Phenol ("Araldite" ®MY0600) | | | | | | |
| | | Tri Glycidyl -p-Amino Phenol ("Araldite" ®MY0500) | | | | | | |
| | | Phenol Novolac type Epoxy ("jER" ®154) | | | | | | |
| | Constituent [A] Epoxy Resin | | | | | | | |
| | | Bisphenol A type Cyanate Ester ("Cytester" ®TA) | 100 | 100 | 100 | 100 | 100 | 100 |
| | | Phenol Novolac type Cyanate Ester ("AroCy" ®XU371) | | | | | | |
| | Constituent [C] Amine Compound | | | | | | | |
| | | 4,4'-Diaminodiphenyl sulfone (SEIKACURE-S) | 2.2 | 6.7 | 11.1 | 22.3 | 2.2 | 6.7 |
| | | 3,3'-Diaminodiphenyl sulfone (3,3'-DAS) | | | | | | |
| | | 4,4'-Diaminodiphenyl ketone | | | | | | |
| | | 3,3'-Diaminodiphenyl ketone | | | | | | |
| | | Diethyltoluenediamine ("Aradur" ®5200) | | | | | | |
| | | 4,4'-Diamino-3,3'-diethyldiphenylmethane ("KAYAHARD" ®A-A) | | | | | | |
| | | Dicyandiamide | | | | | | |
| | Thermoplastic Resin | | | | | | | |
| | | Polyether sulfone ("Virantage" ®VW-10700RP) | 9 | 9 | 9 | 10 | 11 | 11 |
| Mole Number of Glycidyl Group/Mole Number of Cyanate Group | | | 0.75 | 0.75 | 0.75 | 0.75 | 0.75 | 0.75 |
| Mole Number of Active Hydrogen included in Amino Group/Mole Number of Cyanate Group | | | 0.05 | 0.15 | 0.25 | 0.50 | 0.05 | 0.15 |
| Parts by mass of Glycidyl Amine Epoxy Resin having at least tri-functionality, with respect to 100 parts by mass of total epoxy resin | | | 100 | 100 | 100 | 100 | 0 | 0 |
| Thermoplastic Resin content (wt %) | | | 5 | 5 | 5 | 5 | 5 | 5 |
| Resin Composition Properties | Rapid Curing | Exothermic reaction peak temperature (° C.) | 194 | 181 | 172 | 158 | 196 | 182 |
| | | Rating | B | B | A | A | B | B |
| | Pot Life | Viscosity Increase Rratio after retention at 80° C., 2 hrs (—) | 1.4 | 1.8 | 2.4 | 2.8 | 1.4 | 1.8 |
| | | Rating | A | A | B | C | A | A |
| | Tackiness | Storage Elastic Modulus at 30° C. (GPa) | 1.6 | 1.9 | 2.7 | 3.2 | 0.6 | 0.8 |
| | | Tackiness of Prepreg | good | good | good | good | good | good |
| Cured Resin Properties | Heat Resistance Properties | Glass Transition temperature at dry state (° C.) | 270 | 265 | 261 | 255 | 201 | 197 |
| | | Glass Transition temperature after moisture absorption (° C.) | 205 | 197 | 187 | 180 | 182 | 178 |
| | | Rating | A | A | B | B | B | C |
| | Mechanical Properties | Flexural Modulus at dry state at room temperature | 3.5 | 3.6 | 3.6 | 3.8 | 3.2 | 3.3 |
| | | Flexural Modulus after moisture absorption at 82° C. environment | 3.1 | 3.2 | 3.2 | 3.1 | 3.0 | 3.1 |
| | | Rating | B | A | A | B | B | B |

| | | | Example 7 | Example 8 | Example 9 | Example 10 |
|---|---|---|---|---|---|---|
| Thermosetting Resin Composition | Constituent [A] Epoxy Resin | | | | | |
| | | Tetra Glycidyl Diaminodiphenylmethane ("Araldite" ®MY721) | | | 20 | 81 |
| | | Bisphenol A type epoxy ("jER" ®828) | | 102 | 102 | |
| | | Bisphenol F type epoxy ("EPICLON" ®830) | | | | |
| | | Tri Glycidyl -m-Amino Phenol ("Araldite" ®MY0600) | | | | |

TABLE 1-continued

|  |  |  |  |  |  |  |
|---|---|---|---|---|---|---|
|  | Tri Glycidyl -p-Amino Phenol ("Araldite" ®MY0500) |  |  |  |  |  |
|  | Phenol Novolac type Epoxy ("jER" ®154) |  |  |  |  |  |
|  | Constituent [A] Epoxy Resin |  |  |  |  |  |
|  | Bisphenol A type Cyanate Ester ("Cytester" ®TA) |  | 100 | 100 | 100 | 100 |
|  | Phenol Novolac type Cyanate Ester ("AroCy" ®XU371) |  |  |  |  |  |
|  | Constituent [C] Amine Compound |  |  |  |  |  |
|  | 4,4'-Diaminodiphenyl sulfone (SEIKACURE-S) |  | 11.1 | 22.3 | 6.7 | 6.7 |
|  | 3,3'-Diaminodiphenyl sulfone (3,3'-DAS) |  |  |  |  |  |
|  | 4,4'-Diaminodiphenyl ketone |  |  |  |  |  |
|  | 3,3'-Diaminodiphenyl ketone |  |  |  |  |  |
|  | Diethyltoluenediamine ("Aradur" ®5200) |  |  |  |  |  |
|  | 4,4'-Diamino-3,3'-diethyldiphenylmethane ("KAYAHARD" ®A-A) |  |  |  |  |  |
|  | Dicyandiamide |  |  |  |  |  |
|  | Thermoplastic Resin |  |  |  |  |  |
|  | Polyether sulfone ("Virantage" ®VW-10700RP) |  | 11 | 12 | 7 | 10 |
| Mole Number of Glycidyl Group/Mole Number of Cyanate Group |  |  | 0.75 | 0.75 | 0.25 | 1.00 |
| Mole Number of Active Hydrogen included in Amino Group/Mole Number of Cyanate Group |  |  | 0.25 | 0.50 | 0.15 | 0.15 |
| Parts by mass of Glycidyl Amine Epoxy Resin having at least tri-functionality, with respect to 100 parts by mass of total epoxy resin |  |  | 0 | 0 | 100 | 100 |
| Thermoplastic Resin content (wt %) |  |  | 5 | 5 | 5 | 5 |
| Resin Composition Properties | Rapid Curing | Exothermic reaction peak temperature (° C.) | 174 | 160 | 167 | 187 |
|  |  | Rating | A | A | A | B |
|  | Pot Life | Viscosity Increase Rratio after retention at 80° C., 2 hrs (—) | 2.4 | 2.8 | 2.5 | 1.7 |
|  |  | Rating | B | C | B | A |
|  | Tackiness | Storage Elastic Modulus at 30° C. (GPa) | 0.9 | 1.1 | 13.7 | 1.8 |
|  |  | Tackiness of Prepreg | good | good | good | good |
| Cured Resin Properties | Heat Resistance Properties | Glass Transition temperature at dry state (° C.) | 195 | 191 | 271 | 259 |
|  |  | Glass Transition temperature after moisture absorption (° C.) | 174 | 170 | 181 | 195 |
|  |  | Rating | C | C | B | A |
|  | Mechanical Properties | Flexural Modulus at dry state at room temperature | 3.3 | 3.5 | 3.4 | 3.7 |
|  |  | Flexural Modulus after moisture absorption at 82° C. environment | 3.0 | 3.0 | 3.0 | 3.1 |
|  |  | Rating | B | B | B | B |

TABLE 2

|  |  | Example 11 | Example 12 | Example 13 | Example 14 | Example 15 | Example 16 |
|---|---|---|---|---|---|---|---|
| Thermosetting Resin Composition | Constituent [A] Epoxy Resin |  |  |  |  |  |  |
|  | Tetra Glycidyl Diaminodiphenylmethane ("Araldite" ®MY721) | 121 |  |  |  | 18 | 32 |
|  | Bisphenol A type epoxy ("jER" ®828) |  | 34 | 136 | 204 | 72 | 48 |
|  | Bisphenol F type epoxy ("EPICLON" ®830) |  |  |  |  |  |  |
|  | Tri Glycidyl -m-Amino Phenol ("Araldite" ®MY0600) |  |  |  |  |  |  |
|  | Tri Glycidyl -p-Amino Phenol ("Araldite" ®MY0500) |  |  |  |  |  |  |
|  | Phenol Novolac type Epoxy ("jER" ®154) |  |  |  |  |  |  |
|  | Constituent [A] Epoxy Resin |  |  |  |  |  |  |
|  | Bisphenol A type Cyanate Ester ("Cytester" ®TA) | 100 | 100 | 100 | 100 | 100 | 100 |
|  | Phenol novolac type Cyanate Ester ("AroCy" ®XU371) |  |  |  |  |  |  |
|  | Constituent [C] Amine Compound |  |  |  |  |  |  |
|  | 4,4'-Diaminodiphenyl sulfone (SEIKACURE-S) | 6.7 | 6.7 | 6.7 | 6.7 | 6.7 | 6.7 |
|  | 3,3'-Diaminodiphenyl sulfone (3,3'-DAS) |  |  |  |  |  |  |
|  | 4,4'-Diaminodiphenyl ketone |  |  |  |  |  |  |
|  | 3,3'-Diaminodiphenyl ketone |  |  |  |  |  |  |
|  | Diethyltoluenediamine ("Aradur" ®5200) |  |  |  |  |  |  |
|  | 4,4'-Diamino-3,3'-diethyldiphenylmethane ("KAYAHARD" ®A-A) |  |  |  |  |  |  |
|  | Dicyandiamide |  |  |  |  |  |  |
|  | Thermoplastic Resin |  |  |  |  |  |  |
|  | Polyether sulfone ("Virantage" ®VW-10700RP) | 12 | 7 | 13 | 16 | 10 | 10 |
| Mole Number of Glycidyl Group/Mole Number of Cyanate Group |  | 1.50 | 0.25 | 1.00 | 1.50 | 0.75 | 0.75 |
| Mole Number of Active Hydrogen included in Amino Group/Mole Number of Cyanate Group |  | 0.15 | 0.15 | 0.15 | 0.15 | 0.15 | 0.15 |
| Parts by mass of Glycidyl Amine Epoxy Resin having at least tri-functionality, with respect to 100 parts by mass of total epoxy resin |  | 100 | 0 | 0 | 0 | 20 | 40 |
| Thermoplastic Resin content (wt %) |  | 5 | 5 | 5 | 5 | 5 | 5 |
| Resin Composition Properties | Rapid Curing | Exothermic reaction peak temperature (° C.) | 191 | 170 | 189 | 192 | 182 | 182 |
|  |  | Rating | B | A | B | B | B | B |
|  | Pot Life | Viscosity Increase Rratio after retention at 80° C., 2 hrs (—) | 1.5 | 2.5 | 1.7 | 1.5 | 1.8 | 1.8 |
|  |  | Rating | A | B | A | A | A | A |

TABLE 2-continued

| | | | | | | | | |
|---|---|---|---|---|---|---|---|---|
| Cured Resin Properties | Tackiness | Storage Elastic Modulus at 30° C. (GPa) | 1.6 | 6.8 | 0.7 | 0.6 | 1.0 | 1.3 |
| | | Tackiness of Prepreg | good | good | good | good | good | good |
| | Heat Resistance Properties | Glass Transition temperature at dry state (° C.) | 251 | 202 | 190 | 185 | 212 | 231 |
| | | Glass Transition temperature after moisture absorption (° C.) | 183 | 172 | 181 | 175 | 184 | 190 |
| | | Rating | B | C | B | C | B | A |
| | Mechanical Properties | Flexural Modulus at dry state at room temperature | 3.8 | 3.2 | 3.4 | 3.5 | 3.4 | 3.4 |
| | | Flexural Modulus after moisture absorption at 82° C. | 3.0 | 3.0 | 3.1 | 3.0 | 3.1 | 3.1 |
| | | Rating | B | B | B | B | B | B |

| | | | Example 17 | Example 18 | Example 19 | Example 20 |
|---|---|---|---|---|---|---|
| Thermosetting Resin Composition | Constituent [A] Epoxy Resin | | | | | |
| | Tetra Glycidyl Diaminodiphenylmethane ("Araldite" ®MY721) | | 43 | 53 | | |
| | Bisphenol A type epoxy ("jER" ®828) | | 29 | 13 | | |
| | Bisphenol F type epoxy ("EPICLON" ®830) | | | | 93 | |
| | Tri Glycidyl -m-Amino Phenol ("Araldite" ®MY0600) | | | | | |
| | Tri Glycidyl -p-Amino Phenol ("Araldite" ®MY0500) | | | | | 57 |
| | Phenol Novolac type Epoxy ("jER" ®154) | | | | | |
| | Constituent [A] Epoxy Resin | | | | | |
| | Bisphenol A type Cyanate Ester ("Cytester" ®TA) | | 100 | 100 | 100 | 100 |
| | Phenol novolac type Cyanate Ester ("AroCy" ®XU371) | | | | | |
| | Constituent [C] Amine Compound | | | | | |
| | 4,4'-Diaminodiphenyl sulfone (SEIKACURE-S) | | 6.7 | 6.7 | 6.7 | 6.7 |
| | 3,3'-Diaminodiphenyl sulfone (3,3'-DAS) | | | | | |
| | 4,4'-Diaminodiphenyl ketone | | | | | |
| | 3,3'-Diaminodiphenyl ketone | | | | | |
| | Diethyltoluenediamine ("Aradur" ®5200) | | | | | |
| | 4,4'-Diamino-3,3'-diethyldiphenylmethane ("KAYAHARD" ®A-A) | | | | | |
| | Dicyandiamide | | | | | |
| | Thermoplastic Resin | | | | | |
| | Polyether sulfone ("Virantage" ®VW-10700RP) | | 9 | 9 | 10 | 9 |
| Mole Number of Glycidyl Group/Mole Number of Cyanate Group | | | 0.75 | 0.75 | 0.75 | 0.75 |
| Mole Number of Active Hydrogen included in Amino Group/Mole Number of Cyanate Group | | | 0.15 | 0.15 | 0.15 | 0.15 |
| Parts by mass of Glycidyl Amine Epoxy Resin having at least tri-functionality, with respect to 100 parts by mass of total epoxy resin | | | 60 | 80 | 0 | 100 |
| Thermoplastic Resin content (wt %) | | | 5 | 5 | 5 | 5 |
| Resin Composition Properties | Rapid Curing | Exothermic reaction peak temperature (° C.) | 182 | 181 | 180 | 175 |
| | | Rating | B | B | A | A |
| | Pot Life | Viscosity Increase Rratio after retention at 80° C., 2 hrs (—) | 1.8 | 1.8 | 1.8 | 2.0 |
| | | Rating | A | A | A | A |
| | Tackiness | Storage Elastic Modulus at 30° C. (GPa) | 1.5 | 1.8 | 0.7 | 0.8 |
| | | Tackiness of Prepreg | good | good | good | good |
| Cured Resin Properties | Heat Resistance Properties | Glass Transition temperature at dry state (° C.) | 248 | 258 | 189 | 250 |
| | | Glass Transition temperature after moisture absorption (° C.) | 193 | 195 | 172 | 190 |
| | | Rating | A | A | C | A |
| | Mechanical Properties | Flexural Modulus at dry state at room temperature | 3.5 | 3.5 | 3.4 | 3.8 |
| | | Flexural Modulus after moisture absorption at 82° C. | 3.1 | 3.2 | 3.1 | 3.3 |
| | | Rating | B | A | B | A |

TABLE 3

| | | Example 21 | Example 22 | Example 23 | Example 24 | Example 25 | Example 26 |
|---|---|---|---|---|---|---|---|
| Thermosetting Resin Composition | Constituent [A] Epoxy Resin | | | | | | |
| | Tetra Glycidyl Diaminodiphenylmethane ("Araldite" ®MY721) | | | 61 | 62 | 63 | 64 |
| | Bisphenol A type epoxy ("jER" ®828) | | | | | | |
| | Bisphenol F type epoxy ("EPICLON" ®830) | | | | | | |
| | Tri Glycidyl -m-Amino Phenol ("Araldite" ®MY0600) | | | | | | |
| | Tri Glycidyl -p-Amino Phenol ("Araldite" ®MY0500) | 57 | | | | | |
| | Phenol Novolac type Epoxy ("jER" ®154) | | 96 | | | | |
| | Constituent [A] Epoxy Resin | | | | | | |
| | Bisphenol A type Cyanate Ester ("Cytester" ®TA) | 100 | 100 | 80 | 60 | 20 | |
| | Phenol Novolac type Cyanate Ester ("AroCy" ®XU371) | | | 20 | 40 | 80 | 100 |
| | Constituent [C] Amine Compound | | | | | | |

TABLE 3-continued

|  |  |  |  |  |  |  |  |
| --- | --- | --- | --- | --- | --- | --- | --- |
| 4,4'-Diaminodiphenyl sulfone (SEIKACURE-S) | | | 6.7 | 6.7 | 6.8 | 6.8 | 7.0 | 7.1 |
| 3,3'-Diaminodiphenyl sulfone (3,3'-DAS) | | | | | | | | |
| 4,4'-Diaminodiphenyl ketone | | | | | | | | |
| 3,3'-Diaminodiphenyl ketone | | | | | | | | |
| Diethyltoluenediamine ("Aradur" ®5200) | | | | | | | | |
| 4,4'-Diamino-3,3'-diethyldiphenylmethane ("KAYAHARD" ®A-A) | | | | | | | | |
| Dicyandiamide | | | | | | | | |
| Thermoplastic Resin | | | | | | | | |
| Polyether sulfone ("Virantage" ®VW-10700RP) | | | 9 | 11 | 9 | 9 | 9 | 9 |
| Mole Number of Glycidyl Group/Mole Number of Cyanate Group | | | 0.75 | 0.75 | 0.75 | 0.75 | 0.75 | 0.75 |
| Mole Number of Active Hydrogen included in Amino Group/Mole Number of Cyanate Group | | | 0.15 | 0.15 | 0.15 | 0.15 | 0.15 | 0.15 |
| Parts by mass of Glycidyl Amine Epoxy Resin having at least tri-functionality, with respect to 100 parts by mass of total epoxy resin | | | 100 | 0 | 100 | 100 | 100 | 100 |
| Thermoplastic Resin content (wt %) | | | 5 | 5 | 5 | 5 | 5 | 5 |
| Resin Composition Properties | Rapid Curing | Exothermic reaction peak temperature (° C.) | 177 | 180 | 179 | 176 | 173 | 172 |
| | | Rating | A | A | A | A | A | A |
| | Pot Life | Viscosity Increase Rratio after retention at 80° C., 2 hrs (—) | 1.9 | 1.8 | 1.9 | 2.0 | 2.6 | 2.9 |
| | | Rating | A | A | A | A | C | C |
| | Tackiness | Storage Elastic Modulus at 30° C. (GPa) | 0.8 | 2.5 | 5.8 | 8.2 | 10.3 | 11.2 |
| | | Tackiness of Prepreg | good | good | good | good | good | good |
| Cured Resin Properties | Heat Resistance Properties | Glass Transition temperature at dry state (° C.) | 257 | 225 | 273 | 281 | 286 | 290 |
| | | Glass Transition temperature after moisture absorption (° C.) | 194 | 189 | 215 | 240 | 258 | 269 |
| | | Rating | A | B | A | A | A | A |
| | Mechanical Properties | Flexural Modulus at dry state at room temperature | 3.7 | 3.3 | 3.7 | 3.8 | 3.8 | 3.9 |
| | | Flexural Modulus after moisture absorption at 82° C. | 3.2 | 3.1 | 3.3 | 3.4 | 3.3 | 3.3 |
| | | Rating | A | B | A | A | A | A |

|  |  |  | Example 27 | Example 28 | Example 29 | Example 30 |
| --- | --- | --- | --- | --- | --- | --- |
| Thermosetting Resin Composition | Constituent [A] Epoxy Resin | | | | | |
| | Tetra Glycidyl Diaminodiphenylmethane ("Araldite" ®MY721) | | 81 | 61 | 82 | 62 |
| | Bisphenol A type epoxy ("jER" ®828) | | | | | |
| | Bisphenol F type epoxy ("EPICLON" ®830) | | | | | |
| | Tri Glycidyl -m-Amino Phenol ("Araldite" ®MY0600) | | | | | |
| | Tri Glycidyl -p-Amino Phenol ("Araldite" ®MY0500) | | | | | |
| | Phenol Novolac type Epoxy ("jER" ®154) | | | | | |
| | Constituent [A] Epoxy Resin | | | | | |
| | Bisphenol A type Cyanate Ester ("Cytester" ®TA) | | 80 | 80 | 60 | 60 |
| | Phenol Novolac type Cyanate Ester ("AroCy" ®XU371) | | 20 | 20 | 40 | 40 |
| | Constituent [C] Amine Compound | | | | | |
| | 4,4'-Diaminodiphenyl sulfone (SEIKACURE-S) | | 6.8 | 2.3 | 6.8 | 2.3 |
| | 3,3'-Diaminodiphenyl sulfone (3,3'-DAS) | | | | | |
| | 4,4'-Diaminodiphenyl ketone | | | | | |
| | 3,3'-Diaminodiphenyl ketone | | | | | |
| | Diethyltoluenediamine ("Aradur" ®5200) | | | | | |
| | 4,4'-Diamino-3,3'-diethyldiphenylmethane ("KAYAHARD" ®A-A) | | | | | |
| | Dicyandiamide | | | | | |
| | Thermoplastic Resin | | | | | |
| | Polyether sulfone ("Virantage" ®VW-10700RP) | | 10 | 9 | 10 | 9 |
| Mole Number of Glycidyl Group/Mole Number of Cyanate Group | | | 1.00 | 0.75 | 1.00 | 0.75 |
| Mole Number of Active Hydrogen included in Amino Group/Mole Number of Cyanate Group | | | 0.15 | 0.05 | 0.15 | 0.05 |
| Parts by mass of Glycidyl Amine Epoxy Resin having at least tri-functionality, with respect to 100 parts by mass of total epoxy resin | | | 100 | 100 | 100 | 100 |
| Thermoplastic Resin content (wt %) | | | 5 | 5 | 5 | 5 |
| Resin Composition Properties | Rapid Curing | Exothermic reaction peak temperature (° C.) | 184 | 190 | 180 | 188 |
| | | Rating | B | B | A | B |
| | Pot Life | Viscosity Increase Rratio after retention at 80° C., 2 hrs (—) | 1.8 | 1.5 | 1.9 | 1.7 |
| | | Rating | A | A | A | A |
| | Tackiness | Storage Elastic Modulus at 30° C. (GPa) | 5.5 | 5.7 | 7.9 | 8.0 |
| | | Tackiness of Prepreg | good | good | good | good |
| Cured Resin Properties | Heat Resistance Properties | Glass Transition temperature at dry state (° C.) | 270 | 276 | 277 | 284 |
| | | Glass Transition temperature after moisture absorption (° C.) | 214 | 220 | 238 | 245 |
| | | Rating | A | A | A | A |

TABLE 3-continued

|  |  |  | Example 31 | Example 32 | Example 33 | Example 34 |
|---|---|---|---|---|---|---|
| Mechanical Properties | Flexural Modulus at dry state at room temperature | | 3.8 | 3.6 | 3.9 | 3.7 |
| | Flexural Modulus after moisture absorption at 82° C. | | 3.2 | 3.2 | 3.3 | 3.3 |
| | Rating | | A | A | A | A |

TABLE 4

| | | Example 31 | Example 32 | Example 33 | Example 34 | Example 35 | Example 36 | Example 37 |
|---|---|---|---|---|---|---|---|---|
| Thermosetting Resin Composition | Constituent [A] Epoxy Resin | | | | | | | |
| | Tetra Glycidyl Diaminodiphenylmethane ("Araldite" ®MY721) | 60 | 60 | 60 | 60 | 60 | 60 | 60 |
| | Bisphenol A type epoxy ("jER" ®828) | | | | | | | |
| | Bisphenol F type epoxy ("EPICLON" ®830) | | | | | | | |
| | Tri Glycidyl -m-Amino Phenol ("Araldite" ®MY0600) | | | | | | | |
| | Tri Glycidyl -p-Amino Phenol ("Araldite" ®MY0500) | | | | | | | |
| | Phenol Novolac type Epoxy ("jER" ®154) | | | | | | | |
| | Constituent [A] Epoxy Resin | | | | | | | |
| | Bisphenol A type Cyanate Ester ("Cytester" ®TA) | 100 | 100 | 100 | 100 | 100 | 100 | 100 |
| | Phenol Novolac type Cyanate Ester ("AroCy" ®XU371) | | | | | | | |
| | Constituent [C] Amine Compound | | | | | | | |
| | 4,4'-Diaminodiphenyl sulfone (SEIKACURE-S) | | | | | | | 6.7 |
| | 3,3'-Diaminodiphenyl sulfone (3,3'-DAS) | 6.7 | | | | | | |
| | 4,4'-Diaminodiphenyl ketone | | 5.7 | | | | | |
| | 3,3'-Diaminodiphenyl ketone | | | 5.7 | | | | |
| | Diethyltoluenediamine ("Aradur" ®5200) | | | | 1.6 | | | |
| | 4,4'-Diamino-3,3'-diethyldiphenylmethane ("KAYAHARD" ®A-A) | | | | | 2.3 | | |
| | Dicyandiamide | | | | | | 1.3 | |
| | Thermoplastic Resin | | | | | | | |
| | Polyether sulfone ("Virantage" ®VW-10700RP) | 9 | 9 | 9 | 9 | 9 | 9 | — |
| Mole Number of Glycidyl Group/Mole Number of Cyanate Group | | 0.75 | 0.75 | 0.75 | 0.75 | 0.75 | 0.75 | 0.75 |
| Mole Number of Active Hydrogen included in Amino Group/Mole Number of Cyanate Group | | 0.15 | 0.15 | 0.15 | 0.05 | 0.05 | 0.15 | 0.15 |
| Parts by mass of Glycidyl Amine Epoxy Resin having at least tri-functionality, with respect to 100 parts by mass of total epoxy resin | | 100 | 100 | 100 | 100 | 100 | 100 | 100 |
| Thermoplastic Resin content (wt %) | | 5 | 5 | 5 | 5 | 5 | 5 | — |
| Resin Composition Properties | Rapid Curing | Exothermic reaction peak temperature (° C.) | 175 | 172 | 167 | 154 | 158 | 181 | 181 |
| | | Rating | A | A | A | A | A | B | B |
| | Pot Life | Viscosity Increase Rratio after retention at 80° C., 2 hrs (—) | 1.9 | 2.0 | 2.1 | 2.9 | 2.7 | 2.1 | 1.8 |
| | | Rating | A | A | B | C | C | B | A |
| | Tackiness | Storage Elastic Modulus at 30° C. (GPa) | 1.9 | 1.8 | 1.8 | 0.9 | 1.3 | 1.7 | 0.5 |
| | | Tackiness of Prepreg | good | good | good | good | good | good | good |
| Cured Resin Properties | Heat Resistance Properties | Glass Transition temperature at dry state (° C.) | 256 | 265 | 260 | 228 | 241 | 225 | 263 |
| | | Glass Transition temperature after moisture absorption (° C.) | 190 | 202 | 198 | 172 | 178 | 170 | 187 |
| | | Rating | A | A | A | C | C | C | B |
| | Mechanical Properties | Flexural Modulus at dry state at room temperature | 3.9 | 3.6 | 3.9 | 3.3 | 3.3 | 3.6 | 3.6 |
| | | Flexural Modulus after moisture absorption at 82° C. | 3.5 | 3.2 | 3.5 | 2.9 | 2.9 | 3.1 | 3.2 |
| | | Rating | A | A | A | C | C | B | A |

TABLE 5

| | | Comparative Example 1 | Comparative Example 2 | Comparative Example 3 | Comparative Example 4 | Comparative Example 5 | Comparative Example 6 |
|---|---|---|---|---|---|---|---|
| Thermosetting Resin Composition | Constituent [A] Epoxy Resin | | | | | | |
| | Tetra Glycidyl Diaminodiphenylmethane ("Araldite" ®MY721) | 60 | | | | | 16 |
| | Bisphenol A type epoxy ("jER" ®828) | | 102 | | | | |
| | Bisphenol F type epoxy ("EPICLON" ®830) | | | | | | |
| | Tri Glycidyl -m-Amino Phenol ("Araldite" ®MY0600) | | | | | | |
| | Tri Glycidyl -p-Amino Phenol ("Araldite" ®MY0500) | | | | | | |
| | Phenol Novolac type Epoxy ("jER" ®154) | | | | | | |
| | Constituent [A] Epoxy Resin | | | | | | |
| | Bisphenol A type Cyanate Ester ("Cytester" ®TA) | 100 | 100 | 100 | 100 | 100 | 100 |
| | Phenol Novolac type Cyanate Ester ("AroCy" ®XU371) | | | | | | |
| | Constituent [C] Amine Compound | | | | | | |

TABLE 5-continued

| | | | | | | | |
|---|---|---|---|---|---|---|---|
| | 4,4'-Diaminodiphenyl sulfone (SEIKACURE-S) | | 2.2 | 6.7 | 11.1 | | 6.7 |
| | 3,3'-Diaminodiphenyl sulfone (3,3'-DAS) | | | | | | |
| | 4,4'-Diaminodiphenyl ketone | | | | | | |
| | 3,3'-Diaminodiphenyl ketone | | | | | | |
| | Diethyltoluenediamine ("Aradur" ®5200) | | | | | | |
| | 4,4'-Diamino-3,3'-diethyldiphenylmethane ("KAYAHARD" ®A-A) | | | | | | |
| | Dicyandiamide | | | | | | |
| | Thermoplastic Resin | | | | | | |
| | Polyether sulfone ("Virantage" ®VW-10700RP) | | 8 | 11 | 5 | 6 | 6 | 7 |
| | Hardning Accelerator | | | | | | |
| | Tetraphenylphosphonium tetra-p-tolylborate ("TPP-MK" ®) | | | | | | |
| Mole Number of Glycidyl Group/Mole Number of Cyanate Group | | | 0.75 | 0.75 | 0 | 0 | 0 | 0.20 |
| Mole Number of Active Hydrogen included in Amino Group/Mole Number of Cyanate Group | | | 0 | 0 | 0.05 | 0.15 | 0.25 | 0.15 |
| Parts by mass of Glycidyl Amine Epoxy Resin having at least tri-functionality, with respect to 100 parts by mass of total epoxy resin | | | 100 | 0 | — | — | — | 100 |
| Thermoplastic Resin content (wt %) | | | 5 | 5 | 5 | 5 | 5 | 5 |
| Resin Composition Properties | Rapid Curing | Exothermic reaction peak temperature (° C.) | 258 | 259 | 177 | 157 | 149 | 162 |
| | | Rating | D | D | A | A | A | A |
| | Pot Life | Viscosity Increase Rratio after retention at 80° C., 2 hrs (—) | 1.0 | 1.0 | 2.4 | 2.8 | 3.2 | 2.6 |
| | | Rating | A | A | B | C | D | C |
| | Tackiness | Storage Elastic Modulus at 30° C. (GPa) | 1.4 | 0.5 | solid | solid | solid | solid |
| | | Tackiness of Prepreg | good | good | poor | poor | poor | poor |
| Cured Resin Properties | Heat Resistance Properties | Glass Transition temperature at dry state (° C.) | 272 | 203 | 271 | 260 | 251 | 272 |
| | | Glass Transition temperature after moisture absorption (° C.) | 210 | 185 | 165 | 157 | 150 | 178 |
| | | Rating | A | B | D | D | D | C |
| | Mechanical Properties | Flexural Modulus at dry state at room temperature | 3.3 | 3.0 | 3.5 | 3.7 | 3.9 | 3.4 |
| | | Flexural Modulus after moisture absorption at 82° C. | 2.9 | 2.8 | 3.0 | 2.8 | 2.7 | 3.0 |
| | | Rating | C | C | B | C | D | B |

| | | | Comparative Example 7 | Comparative Example 8 | Comparative Example 9 | Comparative Example 10 |
|---|---|---|---|---|---|---|
| Thermosetting Resin Composition | Constituent [A] Epoxy Resin | | | | | |
| | Tetra Glycidyl Diaminodiphenylmethane ("Araldite" ®MY721) | | 141 | 60 | 60 | 20 |
| | Bisphenol A type epoxy ("jER" ®828) | | | | | |
| | Bisphenol F type epoxy ("EPICLON" ®830) | | | | | |
| | Tri Glycidyl -m-Amino Phenol ("Araldite" ®MY0600) | | | | | |
| | Tri Glycidyl -p-Amino Phenol ("Araldite" ®MY0500) | | | | | |
| | Phenol Novolac type Epoxy ("jER" ®154) | | | | | |
| | Constituent [A] Epoxy Resin | | | | | |
| | Bisphenol A type Cyanate Ester ("Cytester" ®TA) | | 100 | 100 | 100 | 100 |
| | Phenol Novolac type Cyanate Ester ("AroCy" ®XU371) | | | | | |
| | Constituent [C] Amine Compound | | | | | |
| | 4,4'-Diaminodiphenyl sulfone (SEIKACURE-S) | | 6.7 | 1.0 | 26.8 | |
| | 3,3'-Diaminodiphenyl sulfone (3,3'-DAS) | | | | | |
| | 4,4'-Diaminodiphenyl ketone | | | | | |
| | 3,3'-Diaminodiphenyl ketone | | | | | |
| | Diethyltoluenediamine ("Aradur" ®5200) | | | | | |
| | 4,4'-Diamino-3,3'-diethyldiphenylmethane ("KAYAHARD" ®A-A) | | | | | |
| | Dicyandiamide | | | | | |
| | Thermoplastic Resin | | | | | |
| | Polyether sulfone ("Virantage" ®VW-10700RP) | | 13 | 9 | 10 | 6 |
| | Hardning Accelerator | | | | | |
| | Tetraphenylphosphonium tetra-p-tolylborate ("TPP-MK" ®) | | | | | |
| Mole Number of Glycidyl Group/Mole Number of Cyanate Group | | | 1.75 | 0.75 | 0.75 | 0.25 |
| Mole Number of Active Hydrogen included in Amino Group/Mole Number of Cyanate Group | | | 0.15 | 0.02 | 0.60 | 0 |
| Parts by mass of Glycidyl Amine Epoxy Resin having at least tri-functionality, with respect to 100 parts by mass of total epoxy resin | | | 100 | 100 | 100 | 100 |
| Thermoplastic Resin content (wt %) | | | 5 | 5 | 5 | 5 |
| Resin Composition Properties | Rapid Curing | Exothermic reaction peak temperature (° C.) | 195 | 228 | 148 | 267 |
| | | Rating | B | D | A | D |
| | Pot Life | Viscosity Increase Rratio after retention at 80° C., 2 hrs (—) | 1.4 | 1.2 | 3.1 | 1.0 |
| | | Rating | A | A | D | A |
| | Tackiness | Storage Elastic Modulus at 30° C. (GPa) | 3.1 | 1.5 | 3.5 | 13.0 |
| | | Tackiness of Prepreg | good | good | good | good |

TABLE 5-continued

| | | | | | | |
|---|---|---|---|---|---|---|
| Cured Resin Properties | Heat Resistance Properties | Glass Transition temperature at dry state (° C.) | 235 | 270 | 248 | 273 |
| | | Glass Transition temperature after moisture absorption (° C.) | 175 | 208 | 174 | 190 |
| | | Rating | C | A | C | A |
| | Mechanical Properties | Flexural Modulus at dry state at room temperature | 3.6 | 3.4 | 3.8 | 3.3 |
| | | Flexural Modulus after moisture absorption at 82° C. | 2.8 | 3.0 | 2.8 | 3.1 |
| | | Rating | C | B | C | B |

TABLE 6

| | | | Comparative Example 11 | Comparative Example 12 | Comparative Example 13 | Comparative Example 14 | Comparative Example 15 | Comparative Example 16 |
|---|---|---|---|---|---|---|---|---|
| Thermosetting Resin Composition | Constituent [A] Epoxy Resin | Tetra Glycidyl Diaminodiphenylmethane ("Araldite" ®MY721) | 81 | 121 | | | | |
| | | Bisphenol A type epoxy ("jER" ®828) | | | 34 | 136 | 204 | |
| | | Bisphenol F type epoxy ("EPICLON" ®830) | | | | | | 93 |
| | | Tri Glycidyl -m-Amino Phenol ("Araldite" ®MY0600) | | | | | | |
| | | Tri Glycidyl -p-Amino Phenol ("Araldite" ®MY0500) | | | | | | |
| | | Phenol Novolac type Epoxy ("jER" ®154) | | | | | | |
| | Constituent [A] Epoxy Resin | Bisphenol A type Cyanate Ester ("Cytester" ®TA) | 100 | 100 | 100 | 100 | 100 | 100 |
| | | Phenol Novolac type Cyanate Ester ("AroCy" ®XU371) | | | | | | |
| | Constituent [C] Amine Compound | 4,4'-Diaminodiphenyl sulfone (SEIKACURE-S) | | | | | | |
| | | 3,3'-Diaminodiphenyl sulfone (3,3'-DAS) | | | | | | |
| | | 4,4'-Diaminodiphenyl ketone | | | | | | |
| | | 3,3'-Diaminodiphenyl ketone | | | | | | |
| | | Diethyltoluenediamine ("Aradur" ®5200) | | | | | | |
| | | 4,4'-Diamino-3,3'-diethyldiphenylmethane ("KAYAHARD" ®A-A) | | | | | | |
| | | Dicyandiamide | | | | | | |
| | Thermoplastic Resin | Polyether sulfone ("Virantage" ®VW-10700RP) | 10 | 12 | 7 | 12 | 16 | 10 |
| | Hardning Accelerator | Tetraphenylphosphonium tetra-p-tolylborate ("TPP-MK" ®) | | | | | | |
| Mole Number of Glycidyl Group/Mole Number of Cyanate Group | | | 1.00 | 1.50 | 0.25 | 1.00 | 1.50 | 0.75 |
| Mole Number of Active Hydrogen included in Amino Group/Mole Number of Cyanate Group | | | 0 | 0 | 0 | 0 | 0 | 0 |
| Parts by mass of Glycidyl Amine Epoxy Resin having at least tri-functionality, with respect to 100 parts by mass of total epoxy resin | | | 100 | 100 | 0 | 0 | 0 | 0 |
| Thermoplastic Resin content (wt %) | | | 5 | 5 | 5 | 5 | 5 | 5 |
| Resin Composition Properties | Rapid Curing | Exothermic reaction peak temperature (° C.) | 245 | 238 | 269 | 246 | 240 | 258 |
| | | Rating | D | D | D | D | D | D |
| | Pot Life | Viscosity Increase Rratio after retention at 80° C., 2 hrs (—) | 1.0 | 1.1 | 1.0 | 1.0 | 1.0 | 1.0 |
| | | Rating | A | A | A | A | A | A |
| | Tackiness | Storage Elastic Modulus at 30° C. (GPa) | 1.1 | 0.9 | 5.8 | 0.5 | 0.5 | 0.4 |
| | | Tackiness of Prepreg | good | good | good | good | good | good |
| Cured Resin Properties | Heat Resistance Properties | Glass Transition temperature at dry state (° C.) | 268 | 261 | 205 | 203 | 195 | 192 |
| | | Glass Transition temperature after moisture absorption (° C.) | 215 | 195 | 174 | 185 | 179 | 179 |
| | | Rating | A | A | C | B | C | C |
| | Mechanical Properties | Flexural Modulus at dry state at room temperature | 3.4 | 3.5 | 3.2 | 3.1 | 3.0 | 3.2 |
| | | Flexural Modulus after moisture absorption at 82° C. | 2.9 | 2.8 | 2.8 | 2.8 | 2.5 | 2.8 |
| | | Rating | C | C | C | C | D | C |

| | | | Comparative Example 17 | Comparative Example 18 | Comparative Example 19 | Comparative Example 20 | Comparative Example 21 |
|---|---|---|---|---|---|---|---|
| Thermosetting Resin Composition | Constituent [A] Epoxy Resin | Tetra Glycidyl Diaminodiphenylmethane ("Araldite" ®MY721) | | | | 100 | |
| | | Bisphenol A type epoxy ("jER" ®828) | | | | | |
| | | Bisphenol F type epoxy ("EPICLON" ®830) | | | | | |
| | | Tri Glycidyl -m-Amino Phenol ("Araldite" ®MY0600) | 57 | | | | |
| | | Tri Glycidyl -p-Amino Phenol ("Araldite" ®MY0500) | | 57 | | | |

TABLE 6-continued

| | | | | | | | |
|---|---|---|---|---|---|---|---|
| | Phenol Novolac type Epoxy ("jER" ®154) | | | | | 96 | |
| | Constituent [A] Epoxy Resin | | | | | | |
| | Bisphenol A type Cyanate Ester ("Cytester" ®TA) | | 100 | 100 | 100 | | 100 |
| | Phenol Novolac type Cyanate Ester ("AroCy" ®XU371) | | | | | | |
| | Constituent [C] Amine Compound | | | | | | |
| | 4,4'-Diaminodiphenyl sulfone (SEIKACURE-S) | | | | | 89.1 | |
| | 3,3'-Diaminodiphenyl sulfone (3,3'-DAS) | | | | | | |
| | 4,4'-Diaminodiphenyl ketone | | | | | | |
| | 3,3'-Diaminodiphenyl ketone | | | | | | |
| | Diethyltoluenediamine ("Aradur" ®5200) | | | | | | |
| | 4,4'-Diamino-3,3'-diethyldiphenylmethane ("KAYAHARD" ®A-A) | | | | | | |
| | Dicyandiamide | | | | | | |
| | Thermoplastic Resin | | | | | | |
| | Polyether sulfone ("Virantage" ®VW-10700RP) | | 8 | 8 | 10 | 10 | 5 |
| | Hardning Accelerator | | | | | | |
| | Tetraphenylphosphonium tetra-p-tolylborate ("TPP-MK" ®) | | | | | | 3 |
| Mole Number of Glycidyl Group/Mole Number of Cyanate Group | | | 0.75 | 0.75 | 0.75 | — | 0 |
| Mole Number of Active Hydrogen included in Amino Group/Mole Number of Cyanate Group | | | 0 | 0 | 0 | — | 0 |
| Parts by mass of Glycidyl Amine Epoxy Resin having at least tri-functionality, with respect to 100 parts by mass of total epoxy resin | | | 100 | 100 | 0 | 100 | — |
| Thermoplastic Resin content (wt %) | | | 5 | 5 | 5 | 5 | 5 |
| Resin Composition Properties | Rapid Curing | Exothermic reaction peak temperature (° C.) | 250 | 252 | 255 | 213 | 217 |
| | | Rating | D | D | D | C | C |
| | Pot Life | Viscosity Increase Rratio after retention at 80° C., 2 hrs (—) | 1.0 | 1.0 | 1.0 | 1.3 | 1.1 |
| | | Rating | A | A | A | A | A |
| | Tackiness | Storage Elastic Modulus at 30° C. (GPa) | 0.4 | 0.4 | 2.1 | 17.1 | solid |
| | | Tackiness of Prepreg | good | good | good | good | poor |
| Cured Resin Properties | Heat Resistance Properties | Glass Transition temperature at dry state (° C.) | 255 | 265 | 232 | 261 | 286 |
| | | Glass Transition temperature after moisture absorption (° C.) | 200 | 207 | 195 | 188 | 169 |
| | | Rating | A | A | A | B | D |
| | Mechanical Properties | Flexural Modulus at dry state at room temperature | 3.6 | 3.4 | 3.1 | 3.9 | 3.4 |
| | | Flexural Modulus after moisture absorption at 82° C. | 2.9 | 2.8 | 2.8 | 2.5 | 3.3 |
| | | Rating | C | C | C | D | A |

The invention claimed is:

1. A thermosetting resin composition comprising at least the following constituents [A] to [C]:
   [A] an epoxy resin containing two or more glycidyl groups;
   [B] a cyanate ester resin containing two or more cyanate groups; and
   [C] an amine compound;
the thermosetting resin composition satisfying the following conditions (1) and (2):
   (1) 0.25≤the number of moles of glycidyl groups in the thermosetting resin composition/the number of moles of cyanate groups in the thermosetting resin composition≤1.5; and
   (2) 0.05≤the number of moles of active hydrogen contained in the amino groups in the thermosetting resin composition/the number of moles of cyanate groups in the thermosetting resin composition≤0.5;
wherein the thermosetting resin composition further comprises a thermoplastic resin; and
wherein the thermoplastic resin is dissolved in the constituent [A] and the constituent [B].

2. The thermosetting resin composition according to claim 1, wherein the amine compound of the constituent [C] is an aromatic amine compound containing two or more amino groups.

3. The thermosetting resin composition according to claim 2, wherein the amine compound of the constituent [C] contains diaminodiphenyl sulfone or diaminodiphenyl ketone.

4. The thermosetting resin composition according to claim 1, wherein the amine compound of the constituent [C] is solid at 25° C.

5. The thermosetting resin composition according to claim 1, wherein the epoxy resin containing two or more glycidyl groups of the constituent [A] contains 40 to 100 parts by mass of a glycidyl amine epoxy resin having at least a tri-functionality with respect to 100 parts by mass of total epoxy resin.

6. The thermosetting resin composition according to claim 1, wherein the cyanate ester resin containing two or more cyanate groups of the constituent [B] contains 20 to 100 parts by mass of a cyanate ester resin represented by Formula (1):

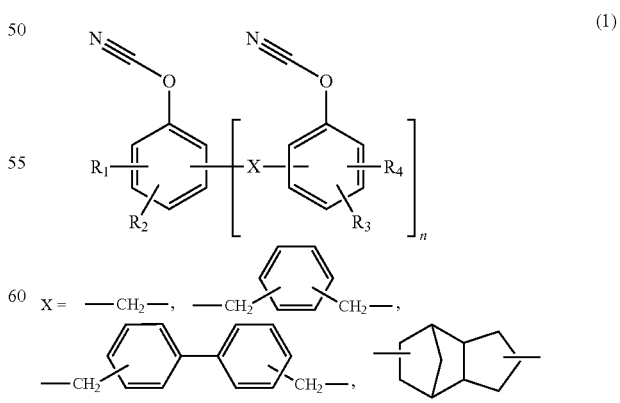

(wherein in Formula (1), $R_1$ to $R_4$ are each selected from at least one selected from the group consisting of a hydrogen atom, an aliphatic hydrocarbon group having 1 to 4 carbon atoms, an alicyclic hydrocarbon group having 4 or less carbon atoms, and a halogen atom; and n represents 2 to 20) with respect to 100 parts by mass of total cyanate ester resin.

7. The thermosetting resin composition according to claim 1, wherein the amount of the thermoplastic resin contained in the thermosetting resin composition is 1 to 30% by mass.

8. The thermosetting resin composition according to claim 1, wherein the thermoplastic resin is polyethersulfone.

9. The thermosetting resin composition according to claim 1, having an exothermic reaction peak of not less than 100 mW/g at 160° C. to 200° C. in an exothermic curve according to differential scanning calorimetry at a temperature ramp rate of 5° C./minute.

10. The thermosetting resin composition according to claim 1, having a storage elastic modulus of 0.1 to 100,000 Pa at 30° C. according to a dynamic viscoelasticity test at a frequency of 0.5 Hz.

11. A prepreg prepared by impregnating a reinforced fiber with the thermosetting resin composition according to claim 1.

12. A fiber reinforced composite material prepared by curing of the prepreg according to claim 11.

13. A fiber reinforced composite material comprising: a reinforced fiber; and a cured resin prepared by curing the thermosetting resin composition according to claim 1.

* * * * *